(12) United States Patent
Okada et al.

(10) Patent No.: US 9,070,052 B2
(45) Date of Patent: Jun. 30, 2015

(54) IMAGE CAPTURING UNIT, COLOR MEASURING DEVICE, IMAGE FORMING DEVICE, COLOR MEASURING SYSTEM, AND COLOR MEASURING METHOD

(71) Applicants: Tatsuhiko Okada, Saitama (JP); Nobuyuki Satoh, Kanagawa (JP); Yasuyuki Suzuki, Kanagawa (JP); Mamoru Yorimoto, Kanagawa (JP); Masato Kobayashi, Kanagawa (JP); Yuichi Sakurada, Tokyo (JP); Suguru Yokozawa, Kanagawa (JP); Tomokazu Kanzawa, Saitama (JP); Daisaku Horikawa, Saitama (JP); Hiroshi Matsumoto, Saitama (JP)

(72) Inventors: Tatsuhiko Okada, Saitama (JP); Nobuyuki Satoh, Kanagawa (JP); Yasuyuki Suzuki, Kanagawa (JP); Mamoru Yorimoto, Kanagawa (JP); Masato Kobayashi, Kanagawa (JP); Yuichi Sakurada, Tokyo (JP); Suguru Yokozawa, Kanagawa (JP); Tomokazu Kanzawa, Saitama (JP); Daisaku Horikawa, Saitama (JP); Hiroshi Matsumoto, Saitama (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 13/845,964

(22) Filed: Mar. 18, 2013

(65) Prior Publication Data
US 2013/0242321 A1    Sep. 19, 2013

(30) Foreign Application Priority Data

Mar. 19, 2012   (JP) .................................. 2012-061578

(51) Int. Cl.
*G06K 15/02* (2006.01)
*H04N 1/60* (2006.01)
*G06K 1/00* (2006.01)

(52) U.S. Cl.
CPC .............. *G06K 15/02* (2013.01); *H04N 1/6033* (2013.01); *H04N 1/6044* (2013.01)

(58) Field of Classification Search
USPC .................................................. 358/1.9, 538
See application file for complete search history.

(56) References Cited

U.S. PATENT DOCUMENTS

| 2012/0069411 | A1* | 3/2012 | Satoh et al. ..................... 358/504 |
| 2012/0206744 | A1* | 8/2012 | Kobayashi ...................... 358/1.9 |
| 2013/0027720 | A1  | 1/2013 | Satoh |
| 2013/0027721 | A1* | 1/2013 | Kobayashi et al. ............. 358/1.9 |
| 2013/0135484 | A1  | 5/2013 | Satoh et al. |

FOREIGN PATENT DOCUMENTS

| JP | 5-223642    | 8/1993  |
| JP | 2002-290757 | 10/2002 |
| JP | 2003-024283 | 1/2003  |
| JP | 2009-239419 | 10/2009 |

OTHER PUBLICATIONS

U.S. Appl. No. 13/780,340, filed Feb. 28, 2013, Yokozawa, et al.
U.S. Appl. No. 13/800,001, filed Mar. 13, 2013, Matsumoto, et al.
U.S. Appl. No. 13/835,823, filed Mar. 15, 2013, Suzuki, et al.
U.S. Appl. No. 13/838,262, filed Mar. 15, 2013, Suzuki, et al.

* cited by examiner

*Primary Examiner* — Quang N Vo
(74) *Attorney, Agent, or Firm* — Oblon, McClelland, Maier & Neustadt, L.L.P.

(57) ABSTRACT

An image capturing unit includes a sensor unit that captures a predetermined area including a subject; a reference chart that is arranged in the predetermined area and captured together with the subject by the sensor unit; an optical path length changing member that is arranged on an optical path extending from the subject to the sensor unit and is capable of changing a length of the optical path.

13 Claims, 31 Drawing Sheets

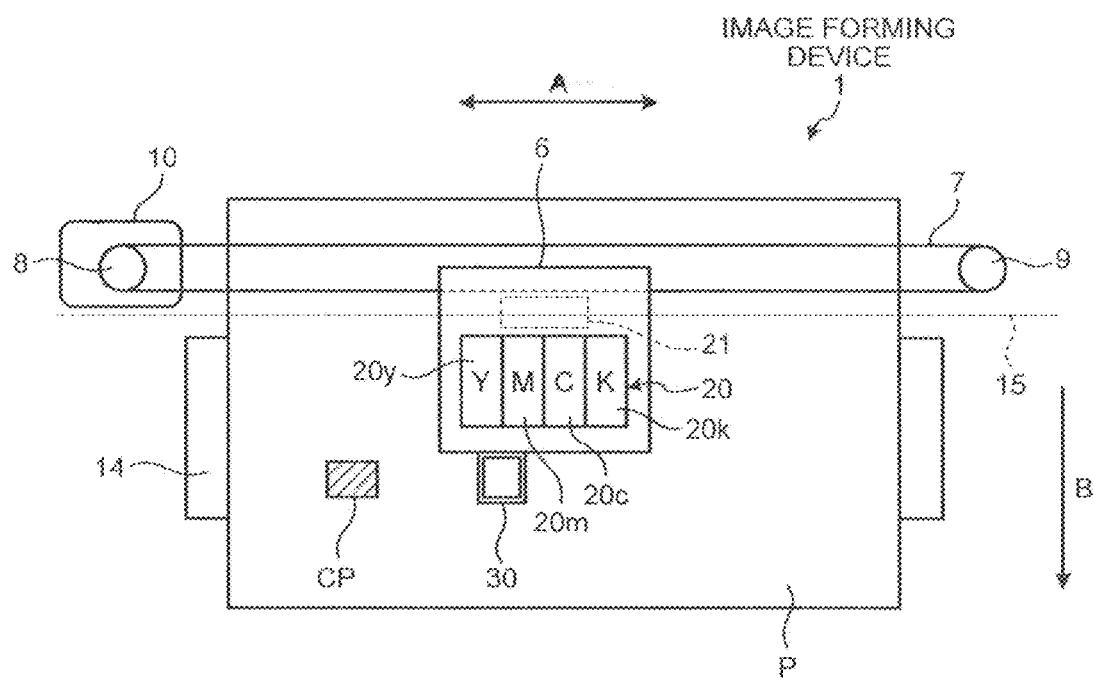
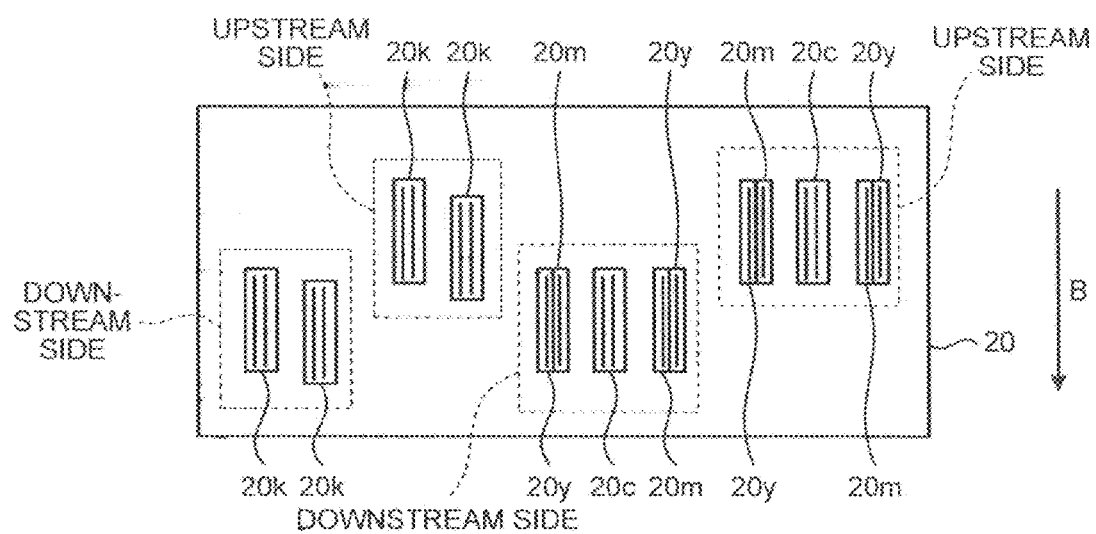

INITIAL REFERENCE RGB VALUE
RdGdBd  ⟨125

MEMORY TABLE
Tb1

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

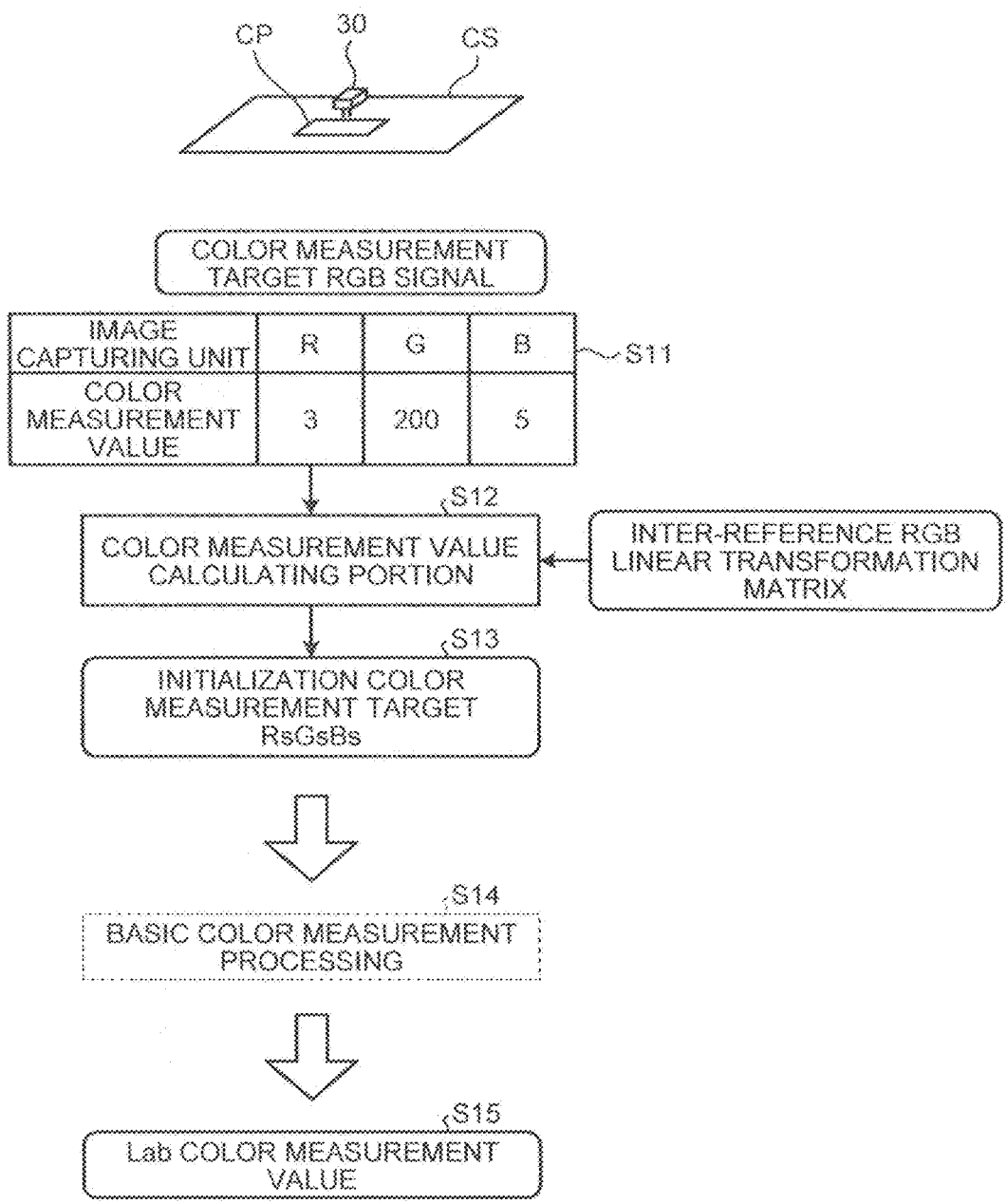

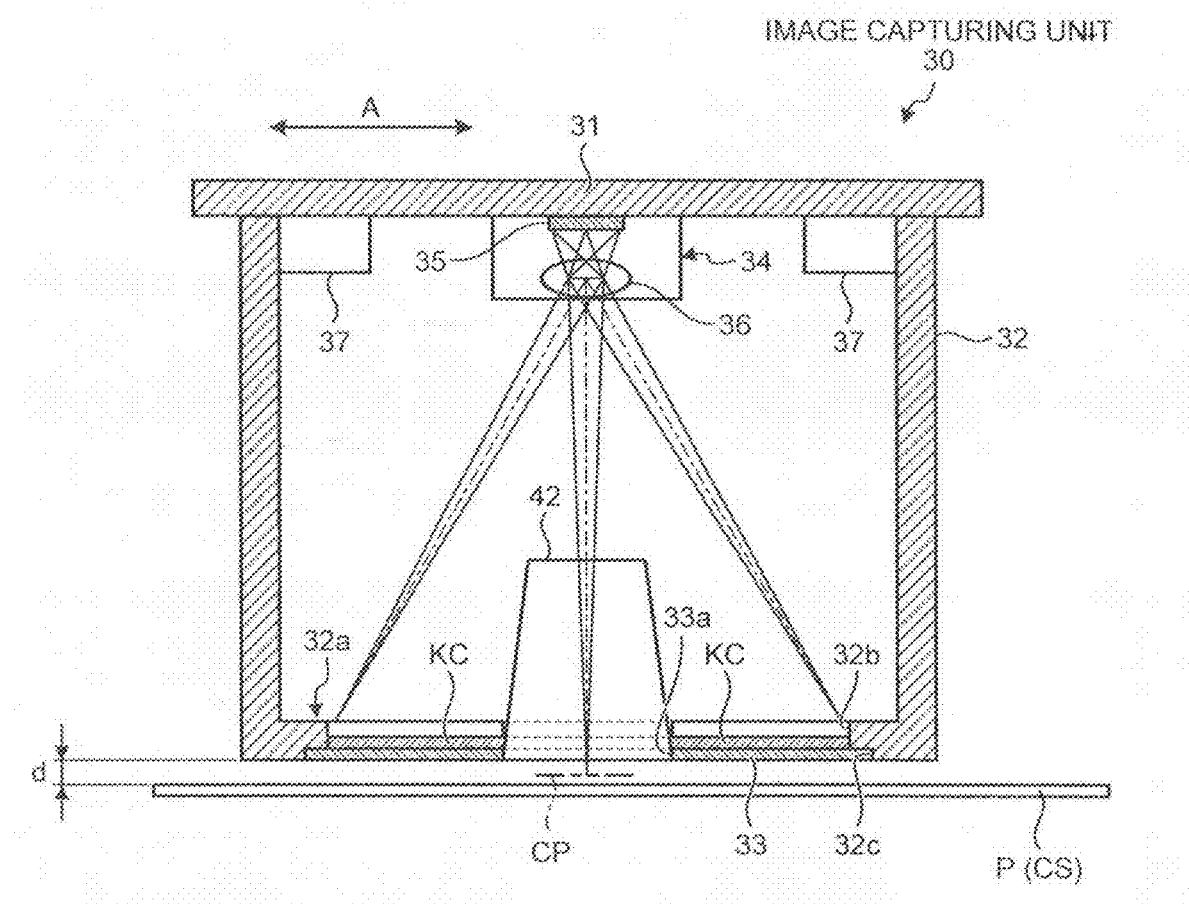

IMAGE CAPTURING UNIT, COLOR MEASURING DEVICE, IMAGE FORMING DEVICE, COLOR MEASURING SYSTEM, AND COLOR MEASURING METHOD

CROSS-REFERENCE TO RELATED APPLICATIONS

The present application claims priority to and incorporates by reference the entire contents of Japanese Patent Application No. 2012-061578 filed in Japan on Mar. 19, 2012.

BACKGROUND OF THE INVENTION

1. Field of the Invention

The present invention relates to an image capturing unit, a color measuring device, a color measuring system, an image forming device, and a color measuring method, and specifically, to an image capturing unit, a color measuring device, a color measuring system, and an image forming device for stably imaging a subject and a reference chart.

2. Description of the Related Art

An image forming device such as a color ink injection image forming device, a color electrophotography image forming device, and the like is used in offset printing of advertising media, pamphlets, and the like of which the number of print copies are relatively small but high image is demanded with improvement in image quality.

In the offset printing in which high image quality is demanded, the color of the printed material demanded by a customer and the color of the print output result that is actually printed and output with the image forming device sometimes differ.

The customer normally checks the color of the printed material on a display and then orders the print, but the image forming device has a color reproducing property unique to each model and may provide a printing result different from the color checked on the display.

A technique of performing color reproduction using a color space, for example, L*a*b* color space and xyz color space that does not depend on the device such as the display and the image forming device is thus used from the prior art.

The image forming device controls the amount of color material, and the like to output a specified color. For example, in the ink injection image forming device, the discharging amount of ink, the print pattern, and the like are calculation controlled, where the discharging amount of ink from the ink head is controlled to control the output color. In the electrophotography image forming device, the attaching amount of toner to a photosensitive element, the light quantity of the laser beam, and the like are controlled to control the output color.

However, the amount of color material, for example, the discharging amount of ink in the ink injection image forming device fluctuates according to the state of the nozzle of the head, viscosity fluctuation of the ink, the fluctuation of the discharge drive element (piezo element, etc.), and hence causes fluctuation in color reproducibility. Furthermore, the discharging amount of ink in the ink injection image forming device may change over time in one image forming device or may differ for each image forming device, and hence the color reproduction of the image may fluctuate for every image forming device.

In the image forming device, therefore, color adjustment processing is conventionally carried out to suppress the fluctuation of output due to the properties unique to the device and enhance the reproducibility of the output with respect to the input. In the color adjustment processing, for example, an image (reference color patch image) of a color patch of a reference color is actually output by the image forming device, and the reference color patch image is performed with color measurement by the color measuring device. A color conversion parameter is generated based on a difference between a color measurement value of the reference color patch image, which is performed with color measurement by the color measuring device, and a color value in a standard color space of the corresponding reference color, and such color conversion parameter is set to the image forming device. Thereafter, when outputting an image corresponding to the input image data, the image forming device performs color conversion on the input image data based on the set color conversion parameter, and records and outputs the image based on the image data of after the color conversion is performed to suppress the fluctuation in the output caused by the properties unique to the device and achieve the image output of high color reproducibility.

In the conventional color adjustment processing, spectrophotometric color measuring device is widely used as a color measuring device for performing color measurement on the reference color patch image, which spectrophotometric color measuring device can obtain spectral reflectivity for every wavelength and thus can carry out highly accurate color measurement. However, the spectrophotometric color measuring device is an expensive device mounted with a great number of sensors, and thus highly accurate color measurement is desired to be carried out using a less expensive device.

Conventionally, there is provided a color measuring device including a reference color measuring means for performing color measurement on a reference color chart in advance to obtain a hue reference value with RGB data, a color image input unit for obtaining the RGB data by imaging a subject including the reference color chart and a body to be performed with color measurement simultaneously or separately, an image extracting means for extracting the RGB data of the reference color chart and the RGB data of the body to be performed with color measurement from the RGB data obtained by the color image input unit, and a calculating means for obtaining a difference between the RGB data of the reference color chart obtained by the image extracting means and the RGB data of the reference color chart obtained with the reference color measuring means, and correcting at least the RGB data of the body to be performed with color measurement using the difference (see Japanese Unexamined Patent Publication No. 5-223642). In the prior art, the reference color chart, which serves as a comparison target of the subject, is placed near the subject to be performed with color measurement, the subject and the reference color chart are simultaneously imaged with a color video camera serving as the color image input unit, the RGB data of the subject is corrected using the RGB data of the reference color chart obtained by the imaging, and then the RGB data of the subject is converted to a color value in the standard color space.

However, in the prior art described in the above publication, the positional relationship between the reference color chart, which is imaged as a comparison target of the subject, and the color image input unit is difficult to maintain constant for each imaging, the image capturing conditions change for every imaging and stable imaging is difficult to carry out.

Therefore, there is a need for an image capturing unit, color measuring device, image forming apparatus, a color measuring system, and a color measuring method that are capable of capturing the subject and the reference chart in a stable positional relationship.

SUMMARY OF THE INVENTION

According to an embodiment, there is provided an image capturing unit that includes a sensor unit that captures a predetermined area including a subject; a reference chart that is arranged in the predetermined area and captured together with the subject by the sensor unit; an optical path length changing member that is arranged on an optical path extending from the subject to the sensor unit and is capable of changing a length of the optical path.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a plan view of a carriage portion;

FIG. 3 is an arrangement view of a print head;

FIG. 14 is an explanatory view of the color measurement processing;

FIG. 19 is a front cross-sectional view of the image capturing unit using a transmissive member for an optical path length changing member;

DETAILED DESCRIPTION OF THE PREFERRED EMBODIMENTS

Hereinafter, preferred examples of the present invention will be described in detail based on the accompanying drawings. The examples described below are preferred examples of the present invention, and hence have technically preferred various limitations, but the scope of the invention is not to be wrongly limited by the following description and all configurations described in the present embodiment are not to be considered as essential configuring elements of the present invention.

First Embodiment

Figure 1:
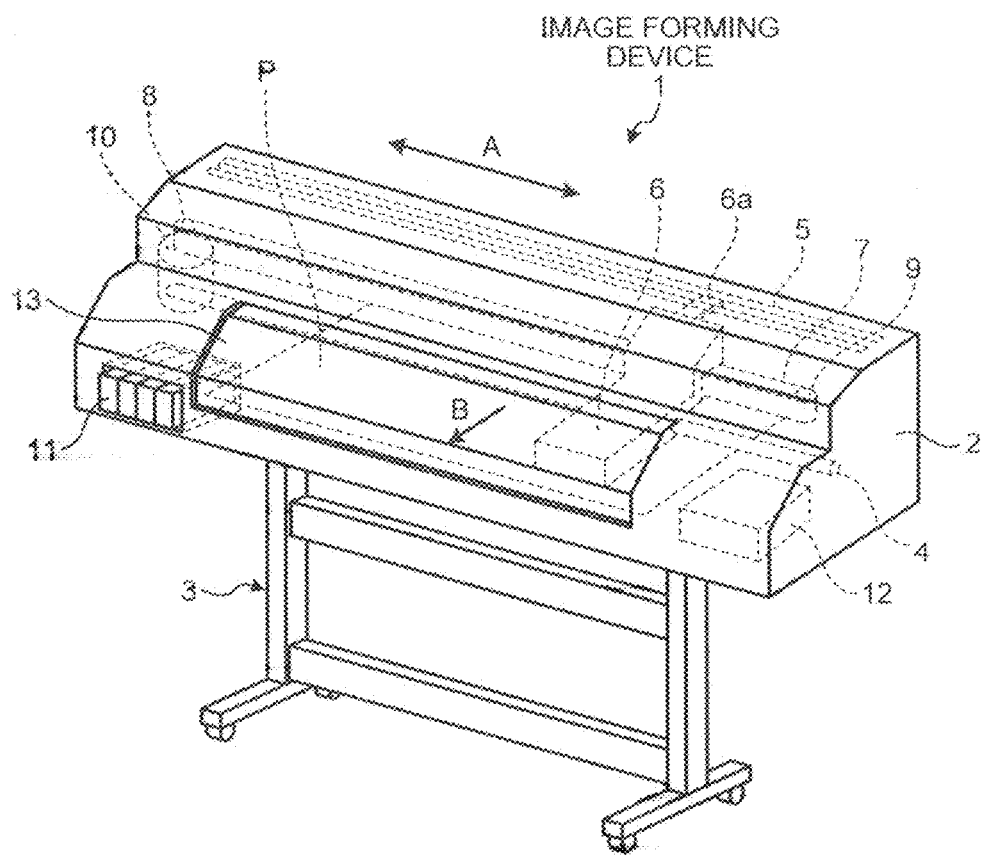
FIG. 1 is a schematic perspective view of an image forming device applied with one example of the present invention.

FIGS. 1 to 34 are views illustrating one example of an image capturing unit, a color measuring device, a color measuring system, and an image forming device of the present invention, where FIG. 1 is a schematic perspective view of an image forming device 1 applied with one example of the image capturing unit, the color measuring device, the color measuring system, and the image forming device of the present invention.

In FIG. 1, the image forming device 1 has a main body housing 2 arranged on a main body frame 3, where a main guide rod 4 and a sub-guide rod 5 are arranged across in a main-scanning direction illustrated with a double headed arrow A in FIG. 1 in the main body housing 2. The main guide rod 4 movably supports a carriage 6, the carriage 6 including a coupling piece 6a that engages with the sub-guide rod 5 to stabilize the position of the carriage 6.

The image forming device 1 has a timing belt 7 in a form of an endless belt arranged along the main guide rod 4, which timing belt 7 is bridged between a drive pulley 8 and a driven pulley 9. The drive pulley 8 is rotatably driven by a main scanning motor 10, and the driven pulley 9 is arranged so as to apply a predetermined tension on the timing belt 7. When the driven pulley 9 is rotatably driven by the main scanning motor 10, the timing belt 7 is rotatably moved in the main-scanning direction according to the rotating direction.

The carriage 6 is coupled to the timing belt 7, and reciprocates in the main-scanning direction along the main guide rod 4 when the timing belt 7 is rotatably moved in the main-scanning direction by the drive pulley 8.

The image forming device 1 has a cartridge unit 11 and a maintaining mechanism unit 12 accommodated at positions on both ends of the main-scanning direction of the main body housing 2, the cartridge unit 11 accommodating cartridges that respectively accommodate each ink of yellow (Y), magenta (M), cyan (C), and black (K) in a replaceable manner. Each cartridge of the cartridge unit 11 is coupled to a print head 20y, 20m, 20c, 20k (see FIG. 2) of a corresponding color of a print head 20 mounted on the carriage 6 with a pipe (not illustrated), and supplies ink from the cartridge to the print head 20y, 20m, 20c, 20k through the pipe. In the following description, the print heads 20y, 20m, 20c, 20k are collectively referred to as a print head 20.

As will be described later, the image forming device 1 discharges ink onto a recording medium P, which is intermittently conveyed in a sub-scanning direction (see arrow B of FIG. 1) orthogonal to the main-scanning direction on a platen 14 (see FIG. 2), while moving the carriage 6 in the main-scanning direction to record and output an image onto the recording medium P.

In other words, the image forming device 1 of the present embodiment intermittently conveys the recording medium P in the sub-scanning direction, and discharges the ink onto the recording medium P on the platen 14 from a nozzle row of the print head 20 mounted on the carriage 6 while moving the carriage 6 in the main-scanning direction while the conveyance of the recording medium P in the sub-scanning direction is stopped to form the image on the recording medium P.

A maintaining mechanism unit 12 performs cleaning of a discharging surface of the print head 20, capping, discharging of unnecessary ink, and the like, to discharge the unnecessary ink from the print head 20 and maintain the reliability of the print head 20.

The image forming device 1 includes a cover 13 capable of opening and closing a conveying unit of the recording medium P, where tasks such as maintenance task of the inside of the main body housing 2, removal of jammed recording medium P, and the like can be carried out by opening the cover 13 at the time of maintenance and at the time of occurrence of jam of the image forming device 1.

As illustrated in FIG. 2, a carriage 6 is mounted with the print heads 20y, 20m, 20c, and 20k, which print heads 20y, 20m, 20c, and 20k are respectively coupled to a cartridge of a corresponding color of the cartridge unit 11 with a pipe to discharge the ink of the corresponding color to the opposing recording medium P. In other words, the print head 20y discharges yellow (Y) ink, the print head 20m discharges magenta (M) ink, the print head 20c discharges cyan (C) ink, and the print head 20k discharges black (K) ink.

The print head 20 is mounted on the carriage 6 such that the discharging surface (nozzle surface) faces the lower side in FIG. 1 (toward recording medium P), and discharges the ink onto the recording medium P.

The image forming device 1 includes an encoder sheet 15 over at least a moving range of the carriage 6 in parallel to the timing belt 7, that is, the main guide rod 4, and an encoder sensor 21 for reading the encoder sheet 15 is attached to the carriage 6. The image forming device 1 controls the drive of the main scanning motor 10 based on the reading result of the encoder sheet 15 by the encoder sensor 21 to control the movement in the main-scanning direction of the carriage 6.

As illustrated in FIG. 3, the print head 20 mounted on the carriage 6 has each print head 20y, 20m, 20c, 20k configured by a plurality of nozzle rows, and discharges ink from the nozzle row onto the recording medium P conveyed on the platen 14 to form an image on the recording medium P. In the image forming device 1, an upstream print head 20 and a downstream print head 20 are mounted on the carriage 6 to ensure a wide width of the image that can be formed on the recording medium P with one scanning of the carriage 6. The print head 20 that discharges black ink is mounted on the carriage 6 by a number twice the number of the print heads 20y, 6m, 6c that discharge color ink to enhance the black printing speed. The print heads 20y, 6m are divided in the main-scanning direction and arranged in an adjacent state to match the order of overlapping the color in the reciprocating operation of the carriage 6 so that the color does not change between outward and return, where the arrangement of each print head 20y, 20m, 20c, and 20k of the print head 20 is not limited to the arrangement illustrated in FIG. 3.

As illustrated in FIG. 2, an image capturing unit 30 is attached to the carriage 6, and the image capturing unit 30 captures an image of a subject to perform color measurement on the subject (object to be performed with color measurement) at the time of color adjustment processing to be described later.

Figure 4:
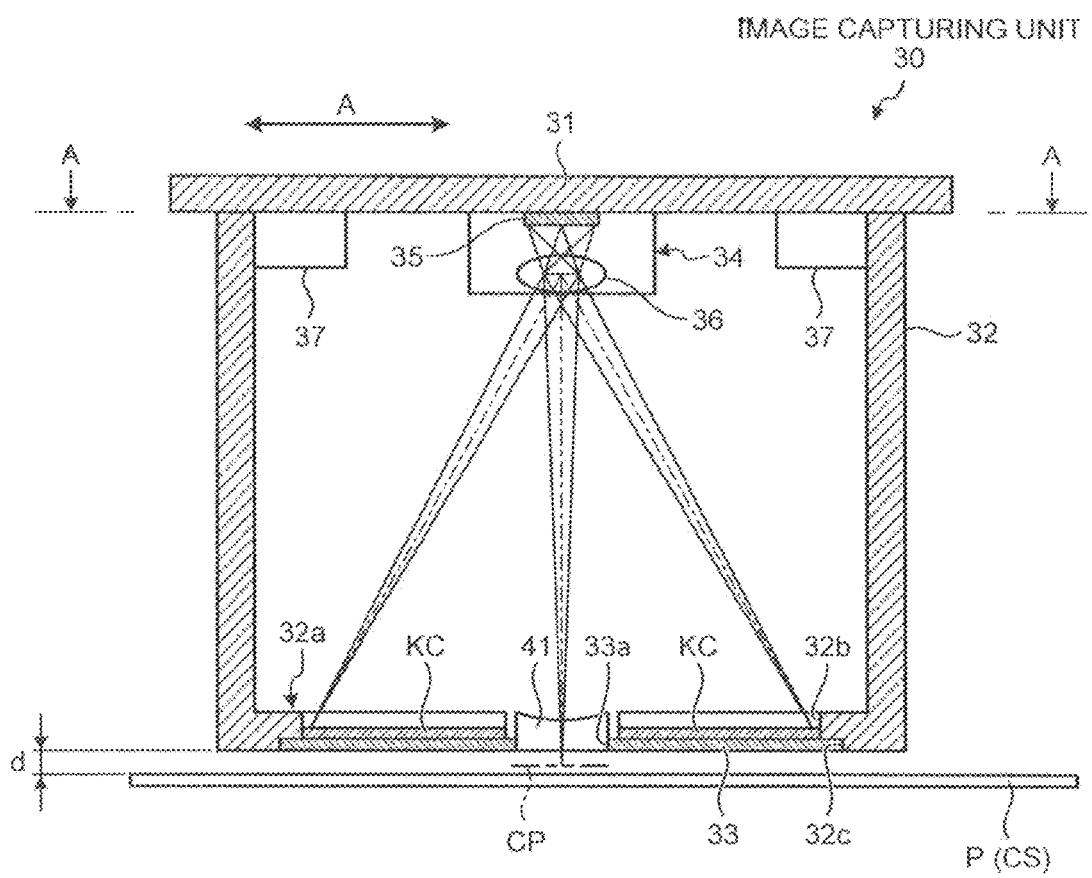
FIG. 4 is a front cross-sectional view of an image capturing unit.
Figure 5:
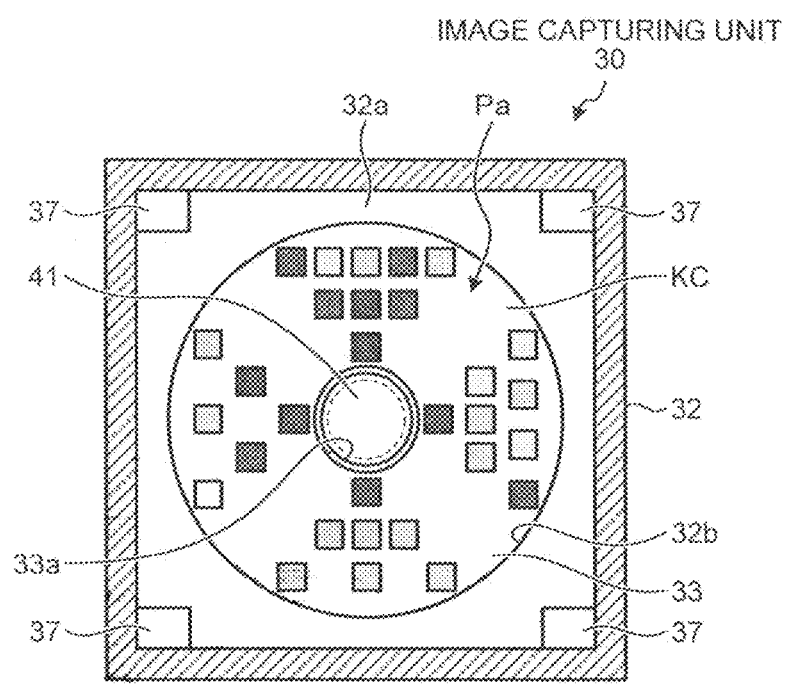
FIG. 5 is a cross-sectional view taken along line A-A of an image capturing unit of FIG. 4.

As illustrated in FIG. 4, which is a front cross-sectional view, and FIG. 5, which is a cross-sectional view taken along line A-A of FIG. 4, the image capturing unit 30 has a square box-shaped housing 32 in which a surface on a substrate 31 side is opened fixed to the substrate 31 by a fastening member (not illustrated), and the substrate 31 is fixed to the carriage 6 illustrated in FIG. 1.

The image capturing unit 30 has the housing 32 attached to the carriage 6 with a lower surface of a surface portion (hereinafter referred to as bottom surface) 32a on the opposite side of the substrate 31 facing the recording medium P on the platen 14 with a predetermined spacing d, the bottom surface 32a being formed with a circular opening 32b having a predetermined size at a central part and a doughnut shaped recess 32c having a larger diameter than the opening 32b over a predetermined width on the recording medium P side at the outer peripheral part with the opening 32b as a center.

As will be described later, the spacing d is preferably small in view of a focal length with respect to a two-dimensional image sensor 35, but is set to a size the lower surface of the housing 32 and the recording medium P do not contact, for example, about 1 mm to 2 mm according to the relationship with the planarity of the recording medium P.

A disc-shaped holding member 33 is detachably attached to a recess 32c of the bottom surface 32a by methods such as adhesion, screw fixation fitting, and the like, and a circular opening 33a having a predetermined size is formed at the central part of the holding member 33.

The housing 32 is not limited to a square box shape, and for example, may be a cylindrical box shape, an elliptic tube shaped box, and the like including the bottom surface 32a having the opening 32b formed at the central part.

The image capturing unit 30 has an image sensor unit 34 arranged at a central part of the surface on the housing 32 side of the substrate 31, the image sensor unit (sensor unit) 34 includes a two-dimensional image sensor 35 such as a CCD (Charge Coupled Device) sensor, a CMOS (Complementary Metal Oxide Semiconductor) sensor and the like, and a lens 36. The image sensor unit 34 captures a predetermined area including the subject in accordance with the size of the two-dimensional image sensor 35 and the distance to the subject.

As will be described later, the opening 33a is used to image a reference color patch KP (see FIG. 12) of a reference sheet KS (see FIG. 12), which is an imaging target (subject) formed on the recording medium P, and a color measurement adjustment color patch CP (see FIG. 14) of a color measurement adjustment sheet CS (see FIG. 14). The opening 33a is to be at least a size at which all the images (patch image) to be imaged can be imaged, but is formed to an open state slightly larger than the size of the image capturing region to be imaged in view of the shadow that forms around the opening 33a due to the spacing d between the housing 32 and the imaging target. Therefore, the opening 33a has the center positioned at a position on a perpendicular line drawn from the image sensor unit 34 to the bottom surface 32a, that is, on an optical axis of the image sensor unit 34.

The reference chart KC is detachably attached to a doughnut shape over a predetermined width, as illustrated in FIG. 5, at a portion positioned in the opening 32b on the holding member 33.

The reference chart KC is imaged at the same time as the reference color patch KP and the color measurement adjustment color patch CP by the image capturing unit 30 as a comparison target with an image capturing color measurement value of the reference color patch KP of the reference sheet KS and the color measurement adjustment color patch CP of the color measurement adjustment sheet CS to be imaged in the color adjustment processing. In other words, the image capturing unit 30 images the reference color patch KP of the reference sheet KS positioned outside the housing 32 and the color measurement adjustment color patch CP of the color measurement adjustment sheet CS through the opening 33a formed in the holding member 33 fitted to the recess 32c of the bottom surface 32a of the housing 32, and also images the color patch on the reference chart KC attached to the upper surface of the outer periphery of the opening 33a of the holding member 33 attached to the bottom surface 32a of the housing 32 as a comparison target.

In a narrow sense, the image capturing unit 30 does not simultaneously read the reference color patch KP of the reference sheet KS and the color measurement adjustment patch CP of the color measurement adjustment sheet CS, and the reference chart KC since the two-dimensional image sensor 35 sequentially scans the pixels to read the image, but can acquire images of the reference color patch KP, the color measurement adjustment patch CP, and the reference chart KC in one frame, which is hereinafter appropriately referred to as simultaneous acquisition.

The reference chart KC is formed with a plurality of reference color patches Pa for color measurement arranged to a circular shape along the doughnut-shaped recess 32c, similar to the reference sheet KS described later, as illustrated in FIG. 5 on a surface (upper surface) on the interior side of the housing 32.

The reference color patch Pa for color measurement include color patches of a primary color of YMC, color patches of a secondary color of RGB, patches of gray scale, and patches of tertiary color.

Similar to the reference patch KP of the reference chart KC to be described later, each patch configuring the reference color patch Pa for color measurement has a color value (Lab value) in the L*a*b* color space, which is a standard color space, measured in advance using a spectroscope BS (see FIG. 12), which becomes a reference value in performing color measurement on the color measurement adjustment color patch CP of the color measurement adjustment sheet CS to be described later.

The configuration of the patch Pa for color measurement arranged in the reference chart KC is not limited to the arrangement example illustrated in FIG. 5, and an arrangement of an arbitrary patch can be used. For example, the patch that can widely specify a color range as much as possible may be used, and the patch of the primary color of YMCK and the patch of the gray scale may be configured with the patch of the color measurement value of the ink used in the image forming device 1. The secondary color patch of RGB of the reference chart KC may be configured with a patch of the color measurement value that can produce color with the ink used in the image forming device 1, and a reference color chart in which the color measurement value such as Japan Color and the like is defined may be used.

The reference chart KC is detachably attached to the upper surface of the holding member 33 detachably attached to the doughnut shaped recess 32c formed on the outer periphery of the opening 32b formed in the bottom surface 32a of the housing 32, and thus can be imaged with the two-dimensional image sensor 35 of the image sensor unit 34 with the focal length similar to the imaging target such as the recording medium P, and the like.

As described above, the reference chart KC is detachably attached to the upper surface of the holding member 33 detachably attached to the doughnut shaped recess 32c formed on the outer periphery of the opening 32b formed in the bottom surface 32a of the housing 32, and thus even if dust and the like that entered the housing 32 attaches to the surface of the reference chart KC, the reference chart KC is detached with the holding member 33 and again attached after cleaning the reference chart KC, thus enhancing the measurement accuracy of the reference chart KC.

The image capturing unit 30 has an illumination light source 37 arranged on the substrate 31 at the position of each of the four corners of the square housing 32, and an LED (Light Emitting Diode), and the like are used as the illumination light source 37. The illumination light source 37 evenly irradiates the imaging target on the recording medium P with illumination light through the reference chart KC and the opening 33a. The arrangement position of the illumination light source 37 is not limited to the substrate 31 at four corners of the housing 32, and may be an appropriate position as long as it is a position of evenly irradiating the imaging target on the recording medium P with the illumination light through the reference chart KC and the opening 33a.

The image capturing unit 30 has a concave lens (optical path length changing member for the subject) 41 fitted to the opening 33a formed at a central part of the holding member 33 attached to the bottom surface 32a of the housing 32, and the concave lens 41 is arranged on the optical path of the recording medium P and the two-dimensional image sensor 35 passing through the opening 33a.

Since the concave lens 41 is fitted to the opening 33a formed on the optical axis of the image sensor unit 34, the center of the concave lens 41 is positioned on the optical axis of the image sensor unit 34, and a concave lens having a curvature at which the optical path length from the image capturing surface of the recording medium P to the image sensor unit 34 matches the optical path length from the reference chart KC to the image sensor unit 34 is used for the concave lens 41.

Figure 6:
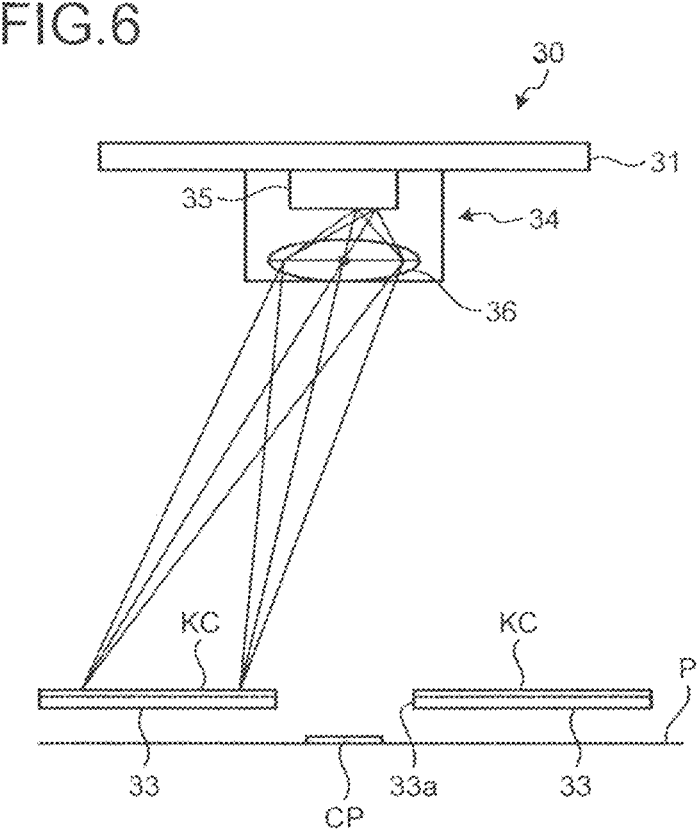
FIG. 6 is an explanatory view of an optical path length at the time of imaging a reference chart when a concave lens is not arranged.
Figure 7:
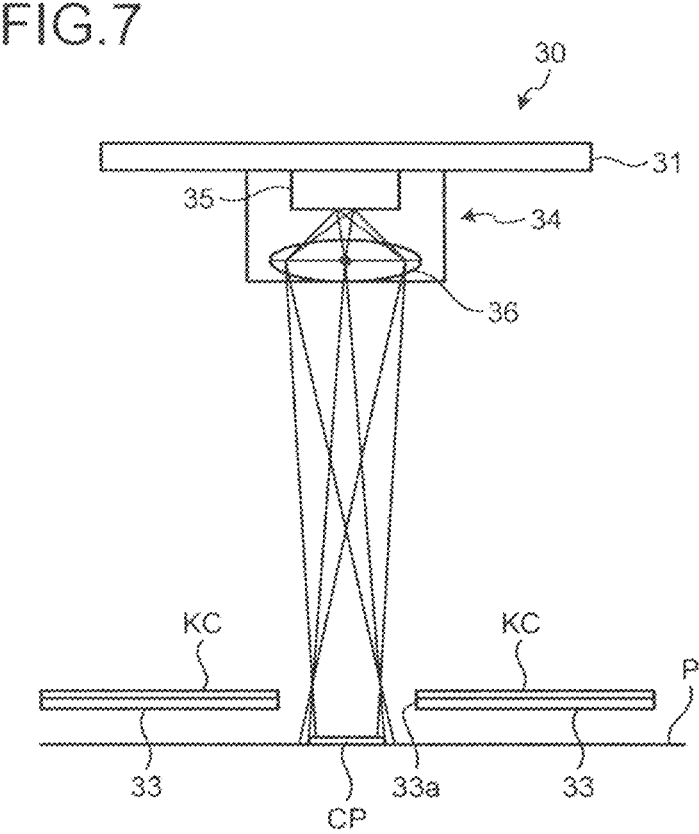
FIG. 7 is an explanatory view of the optical path length at the time of imaging an imaging target when the concave lens is not arranged.

In other words, when seen from the image sensor unit 34, the image capturing unit 30 has a different distance with the reference chart KC on the holding member 33 and the imaging target (e.g., color measurement adjustment patch CP formed on the recording medium P) through the opening 33a, and thus when the imaging target is imaged with the focus on the reference chart KC, as illustrated in FIG. 6, the position is deviated from the position of the imaging target and may become defocused since the focal length is the distance of the reference chart KC, as illustrated in FIG. 7.

Figure 8A:
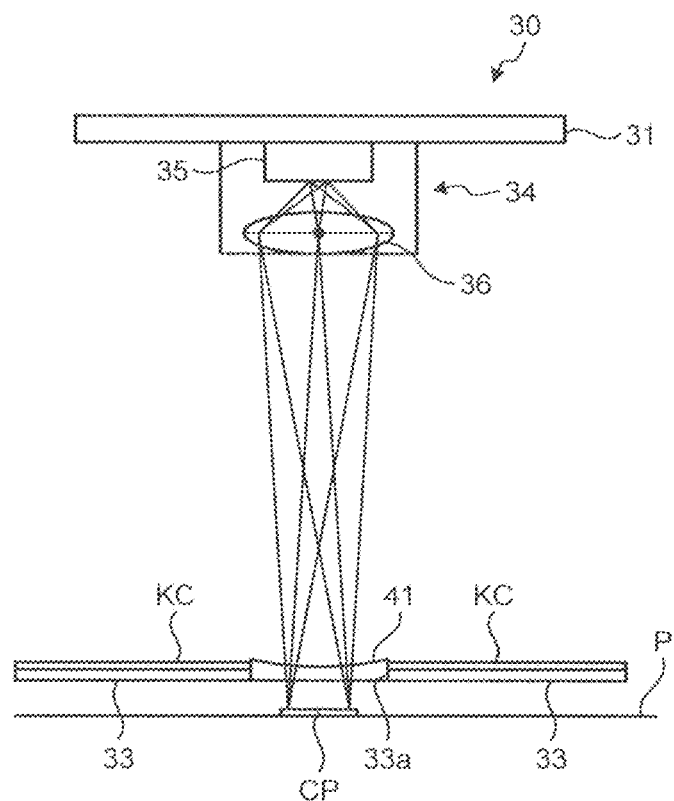
FIG. 8A is an explanatory view of a focal length adjustment processing by the concave lens.
Figure 8B:
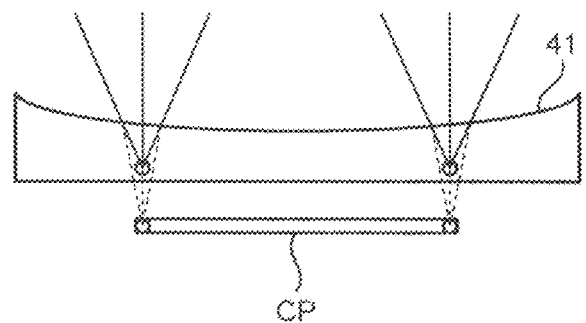
FIG. 8B is an enlarged view of the portion of the concave lens.

However, the image capturing unit 30 of the present embodiment has the concave lens 41 fitted to the opening 33a for imaging the imaging target, as illustrated in FIG. 8A, and is imaged with the focal length of the imaging target extended to the position of the imaging target illustrated with a broken line (state in which optical path length is changed) from the position illustrated with a solid line in FIG. 8B (focal length when concave lens 41 is not arranged) according to the curvature of the concave lens 41, as illustrated in FIG. 8B which is an enlarged view of the portion of the concave lens 41. That is, the concave lens 41 is an optical path length changing member capable of changing a length of the optical path extending from the subject to the sensor unit.

Figure 9:
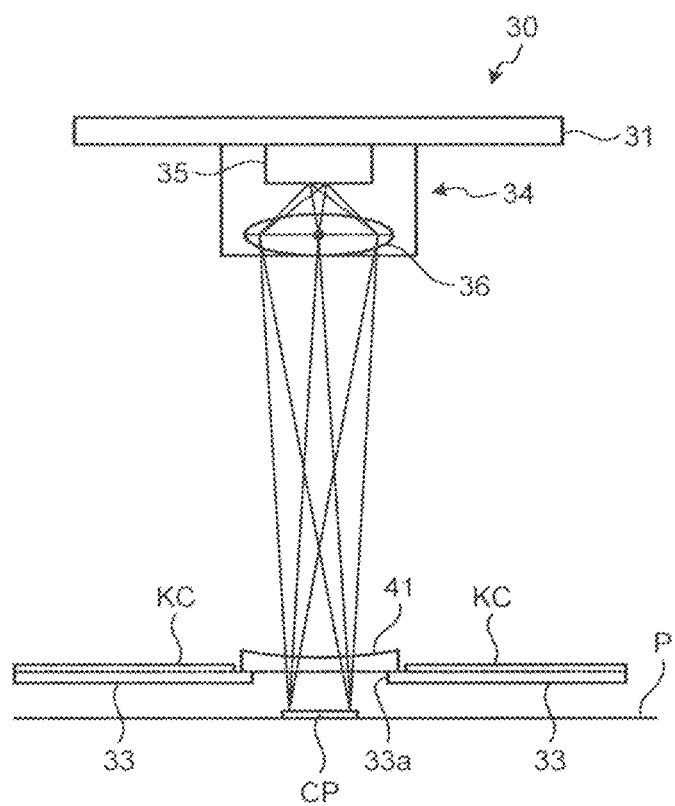
FIG. 9 is a front view of the relevant portion of the image capturing unit in which the concave lens is arranged on a bottom surface formed with an opening.

In the description made above, a case in which the concave lens 41 is embedded in the opening 33a has been described, but the concave lens 41 is not limited to the configuration of being embedded in the opening 33a, and may be arranged at an appropriate position, for example, on the holding member 33 at the periphery of the opening 33a, as illustrated in FIG. 9, as long as it is on the optical path of the imaging target through the opening 33a and the image sensor unit 34. However, if arranged at an appropriate position between the opening 33a and the image sensor unit 34, it needs to be a position that does not become a hindrance of the optical path for imaging the reference chart KC and the curvature of the concave lens 41 needs to accord with the arrangement position.

The image capturing unit 30 can simultaneously image the reference chart KC and the imaging surface of the recording medium P under the same illumination condition, where the illumination light that irradiates the imaging surface of the recording medium P through the concave lens 41 and the opening 33a and the illumination light that irradiates the reference chart KC are illumination light from the same illumination light source 37. In other words, the illumination light source 37 that irradiates the subject always illuminates the reference chart KC so that the reference chart KC and the subject on the recording medium P can be illuminated with substantially the same illumination condition, and the reference chart KC and the subject can be imaged with substantially the same illumination condition.

Figure 10:
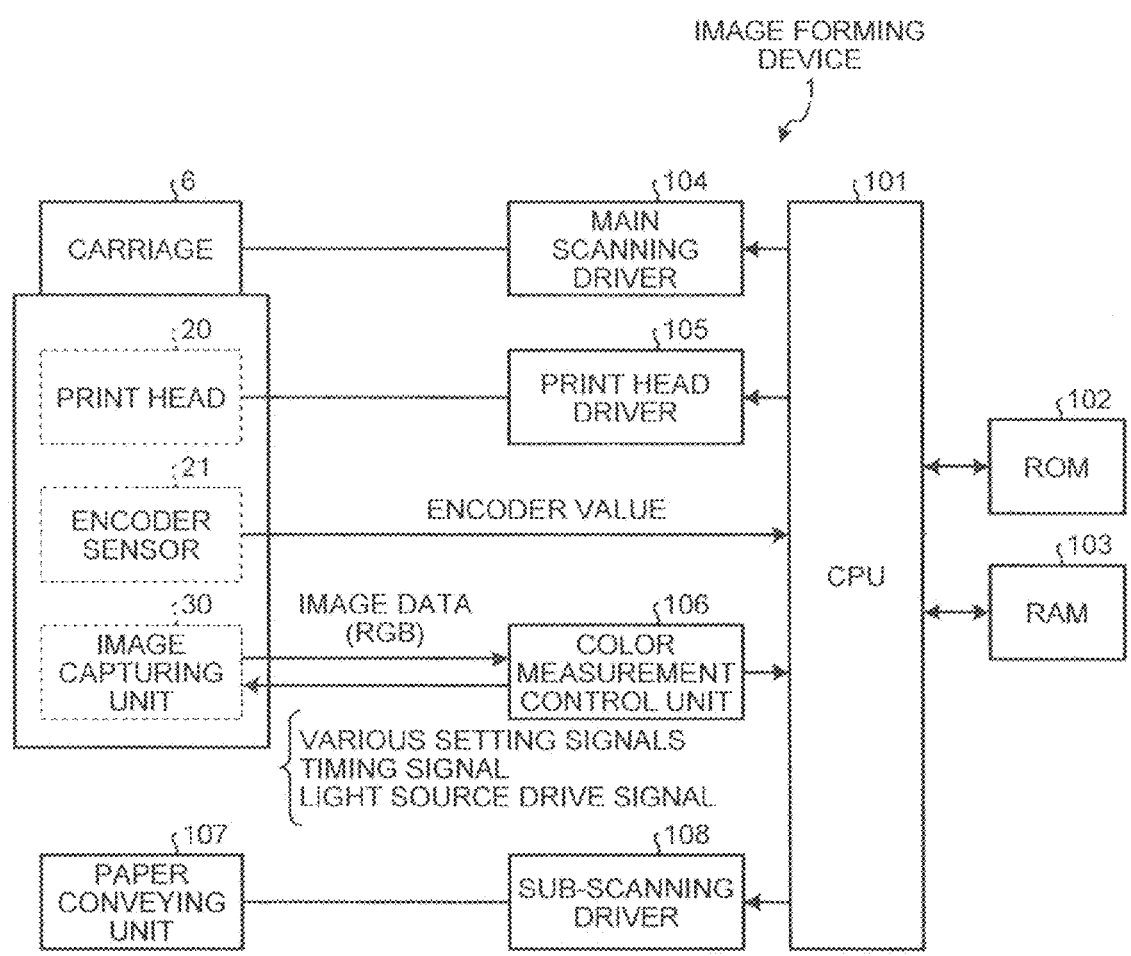
FIG. 10 is a block configuration diagram of the relevant portion of the image forming device.

The image forming device 1 of the present embodiment is block configured as illustrated in FIG. 10, and includes a CPU (Central Processing Unit) 101, a ROM (Read Only Memory) 102, a RAM (Random Access Memory) 103, a main scanning driver 104, a print head driver 105, a color measurement control unit 106, a paper conveying unit 107, a sub-scanning driver 108, and the like, and also includes the print head 20 mounted on the carriage 6, the encoder sensor 21, the image capturing unit 30, and the like.

The ROM 102 stores programs such as basic program for the image forming device 1, color adjustment processing program, and the like, as well as necessary system data, and the like; and the CPU 101 controls each unit of the image forming device 1 while using the RAM 103 as a work memory based on the programs in the ROM 102 to execute the basic processing for the image forming device 1 and execute the color adjustment processing at the time of forming an image based on the color measurement value obtained with the color measurement processing in the color measurement control unit 106 on the basis of the RGB value imaged by the image capturing unit 30.

In the control of the carriage 6 and the paper conveying unit 107, the CPU 101 controls the drive of the main scanning driver 104 based on an encoder value from the encoder sensor 21 to control the movement of the carriage 6 in the main-scanning direction and the CPU 101 also controls the drive of the sub-scanning motor (not illustrated) and the paper conveying unit 107 such as the conveying roller through the sub-scanning driver 108. The CPU 101 also controls the discharge timing of the ink and the ink discharging amount by the print head 20 through the print head driver 105. The CPU 101 controls the lighting drive of the illumination light source 37 of the image capturing unit 30 through the color measurement control unit 106.

As described above, the image capturing unit 30 images the color measurement adjustment patch CP formed by the print head 20 on the recording medium P at the time of color measurement, as will be described later, to generate a color measurement value for color adjustment for accurately reproducing the color of the image data when recording and outputting the image as a color intended by the user, and outputs the imaged RGB value to the CPU 101.

Figure 11:
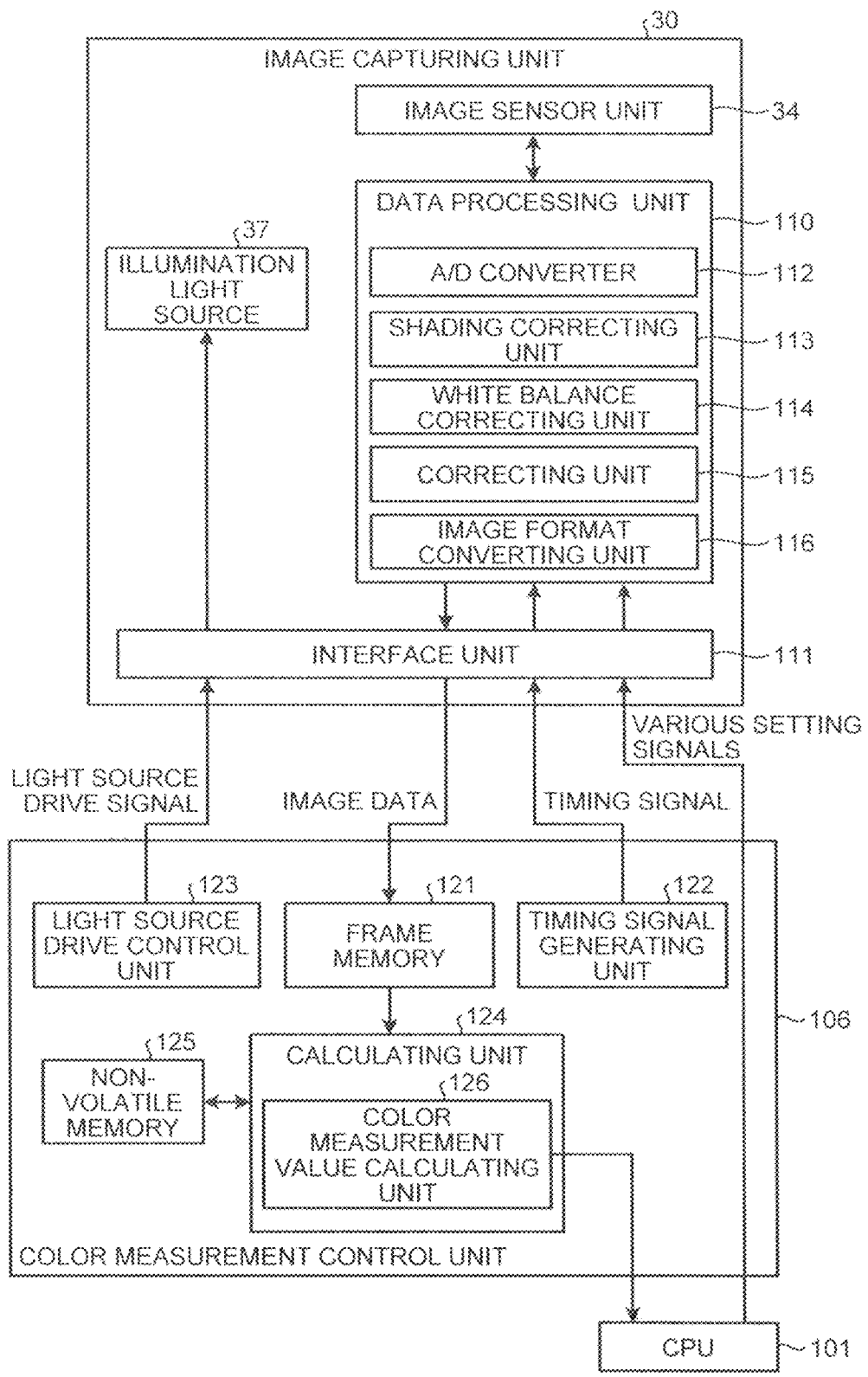
FIG. 11 is a block configuration diagram of the image capturing unit and the color measurement control unit.

The image capturing unit 30 and the color measurement control unit 106 are block configured as illustrated in FIG. 11. The image capturing unit 30 includes the illumination light source 37 and the image sensor unit 34, and also includes an data processing unit 110, an interface unit 111, and the like, and the data processing unit 110 includes an A/D converter 112, a shading correcting unit 113, a white balance correcting unit 114, a γ correcting unit 115, and an image format converting unit 116.

The image capturing unit 30 outputs analog RGB image data of which the subject and the reference chart KC are simultaneously imaged by the image sensor unit 34 to the data processing unit 110, and the data processing unit 110 performs necessary image processing on the analog RGB image data transmitted from the image sensor unit 34 and outputs to the color measurement control unit 106.

The A/D converter 112 of the data processing unit 110 converts the analog RGB image data input from the image sensor unit 34 to digital data and outputs the same to the shading correcting unit 113.

The shading correcting unit 113 corrects the error of the image data caused by illuminance unevenness of the illumination light from the illumination light source 37 on the image capturing range of the image sensor unit 34 with respect to the RGB image data input from the A/D converter 112, and outputs the result to the white balance correcting unit 114.

The white balance correcting unit 114 corrects the white balance with respect to the RGB image data performed with the shading correction, and outputs to the γ correcting unit 115.

The γ correcting unit 115 performs correction so as to compensate the linearity of the sensitivity of the image sensor unit 34 with respect to the image data input from the white balance correcting unit 114, and outputs to the image format converting unit 116.

The image format converting unit 116 converts the image data performed with the γ correction to an arbitrary format, and outputs to the color measurement control unit 106 through the interface unit 111.

The interface unit 111 is an interface for the image capturing unit 30 to acquire various setting signals, timing signal, and light source drive signal transmitted from the color measurement control unit 106, and for the image capturing unit 30 to transmit the image data to the color measurement control unit 106.

The color measurement control unit 106 includes a frame memory 121, a timing signal generating unit 122, a light source drive control unit 123, a calculating unit 124, and a non-volatile memory 125, and the calculating unit 124 includes a color measurement value calculating unit 126.

The frame memory 121 is a memory for temporarily storing the image data transmitted from the image capturing unit 30, and outputs the stored image data to the calculating unit 124.

Figure 12:
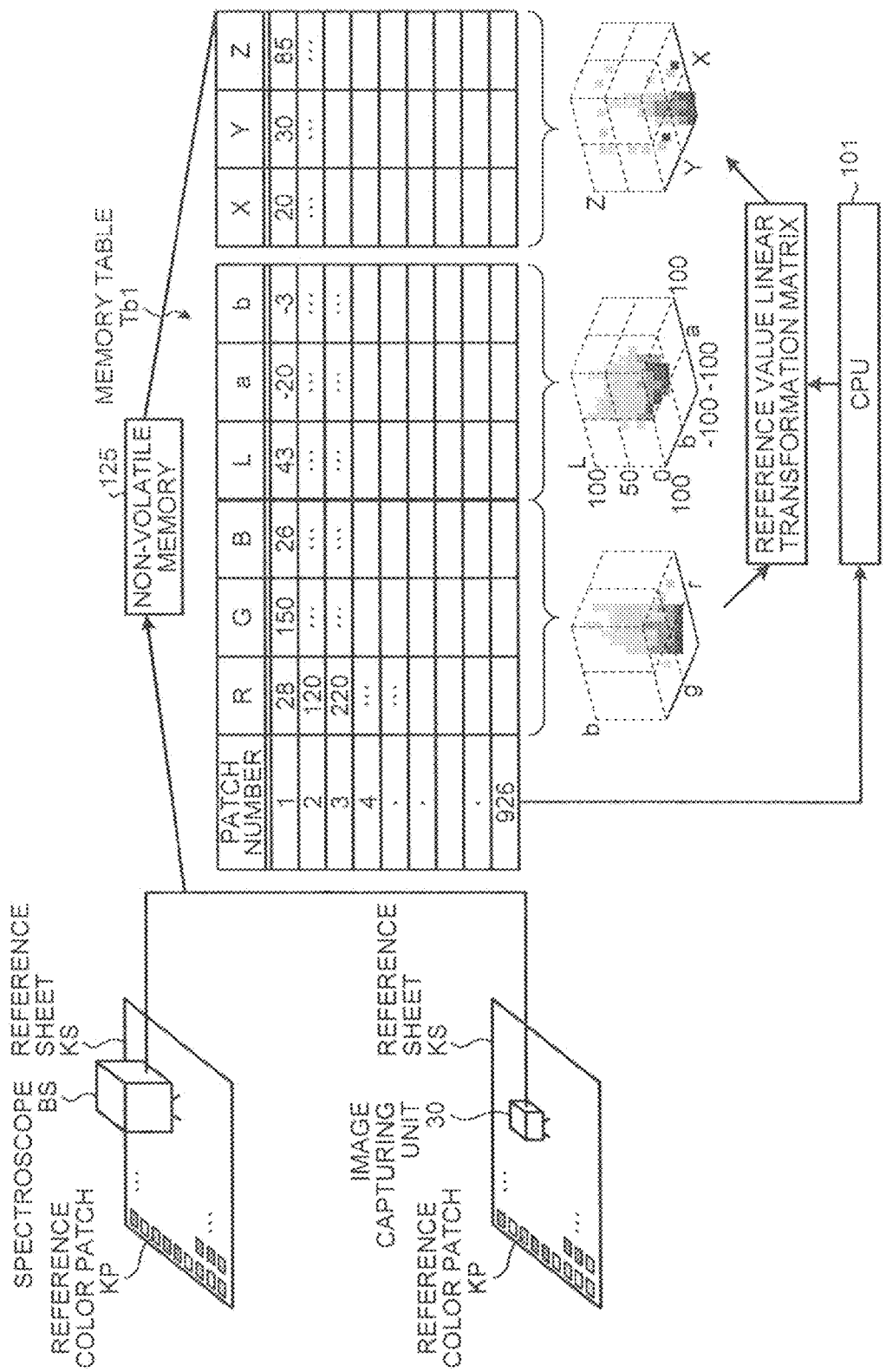
FIG. 12 is an explanatory view of acquiring processing of the reference color measurement value and the imaging reference RGB value from the reference sheet and the reference value linear transformation matrix acquiring processing.

As illustrated in FIG. 12, the non-volatile memory 125 has at least one of (both Lab value and XYZ value in FIG. 12) the Lab value or the XYZ value, which are color measurement values of the color measurement result of a plurality of reference color patches KP formed in an array on the reference sheet KS by a spectroscope (color measuring device) BS stored as a reference color measurement value in correspondence with the patch number in a memory table Tb1 of the non-volatile memory 125.

The image forming device 1 sets the reference sheet KS on the platen 14 of the image forming device 1 in a state the reference color measurement value is stored in the memory table Tb1 of the non-volatile memory 125 and in an initial state of the image forming device 1, controls the movement of the carriage 6 to correspond the imaging reference RGB value, obtained by reading the reference patch KP same as that read with the spectroscope BS in the reference sheet KS by the image capturing unit 30, with the patch number, that is, stores in correspondence with the reference color measurement value in the memory table Tb1 of the non-volatile memory 125, and acquires the RGB value by imaging each patch of the reference chart KC of the image capturing unit 30 and stores the RGB value of each patch of the reference chart KC as an initial reference RGB value RdGdBd in the memory table Tb1 of the non-volatile memory 125 under the control of the calculating unit 124.

After storing the reference color measurement value, the imaging reference RGB value, and the initial reference RGB value RdGdBd in the non-volatile memory 125, the image forming device 1 causes the color measurement value calculating unit 126 to calculate a reference value linear transformation matrix for mutual conversion on the pair of XYZ value of the reference color measurement value and the imaging RGB value stored in the non-volatile memory 125, that is, the pair of XYZ value and the imaging reference RGB value of the same patch number, and store the calculated reference value linear transformation matrix in the non-volatile memory 125.

In the image forming device 1, the above described processing is executed in the initial state of the image forming device 1, the reference color measurement value, the imaging reference RGB value, and the initial reference RGB value RdGdBd, which are the execution results, are registered in the memory table Tb1 of the non-volatile memory 125, and then the reference value linear transformation matrix is calculated and stored in the non-volatile memory 125.

Furthermore, as will be described later, the image forming device 1 of the present embodiment simultaneously images the color measurement adjustment color patch CP and the reference chart KC arranged inside the housing 32, which serve as the subject formed on the recording medium P by the print head 20 that changed over time, and the like, with the image sensor unit 34, and outputs the image data including the color measurement adjustment color patch CP and the reference chart KC to the color measurement control unit 106 at the time of color adjustment processing. The color measurement control unit 106 converts the color measurement adjustment color patch CP imaged by the image sensor unit 34 at the time of color adjustment processing acquired from the image capturing unit 30 to the initial reference RGB value RdGdBd of the patch Pa of the reference chart KC simultaneously read and stored when the reference color patch (hereinafter referred to as initial reference color patch) of the reference sheet KS is read with the image capturing unit 30, and then performs color measurement processing of extracting a portion having linearity of the color measurement adjustment patch CP, performing linear conversion and obtaining the color measurement value on the initial reference RGB value RdGdBd.

In other words, the calculating unit 124 controls the operation of the color measurement control unit 106, the color measurement value calculating unit 126 executes the color measurement processing and outputs the color measurement value, which is the processing result of the color measurement processing, to the CPU 101, and the CPU 101 performs color adjustment processing on the image data using the color measurement value and controls the print head 20 based on the color adjustment processed image data to form an image with the color reproducibility enhanced.

The image forming device 1 of the present embodiment is built as the image forming device 1 including the color measuring device for executing the color measuring method for inexpensively and stably achieving color reproducibility, as will be described later, by reading the color measurement program for executing the color measuring method of the present embodiment recorded in a computer readable recording medium such as ROM, EEPROM (Electrically Erasable and Programmable Read Only Memory), EPROM, flash memory, flexible disc, CD-ROM (Compact Disc Read Only Memory), CD-RW (Compact Disc Rewritable), DVD (Digital Versatile Disk), SD (Secure Digital) card, MO (Magneto-Optical Disc) and the like, and loading the program onto the ROM 102 or the non-volatile memory 125. The color measurement program is a computer executable program described with programming language such as assembler, C, C++, C#, Java (registered trademark), legacy or object-oriented programming language and the like, and can be distributed by being stored in the recording medium.

The operation of the present embodiment will be described below. The image forming device 1 of the present embodiment executes the image capturing unit and the color measuring method for inexpensively and stably achieving color reproducibility.

As illustrated in FIG. 12, the image forming device 1 of the present embodiment stores at least one of the Lab value or the XYZ value, which are the color measurement results of a plurality of reference color patches formed in an array on the reference sheet KS by the spectrometer BS, in correspondence with the patch number in the memory table Tb1 of the non-volatile memory 125 under the control of the CPU 101.

The image forming device 1 sets the reference sheet KS on the platen 14 of the image forming device 1 in a state the reference color measurement value is stored in the memory table Tb1 of the non-volatile memory 125 and in a state the image forming device 1 is in an initial state by manufacturing, overfall and the like, controls the movement of the carriage 6 to read the reference patch same as that read with the spectrometer BS of the reference sheet KS by the image capturing unit 30 and at the same time, images each patch (initial reference color patch) of the reference chart KC arranged inside the housing 32.

Figures 13A, 13B:
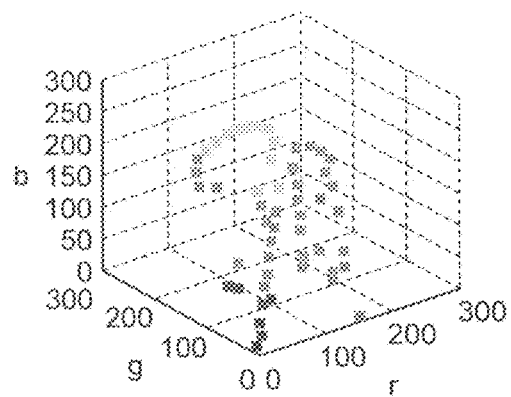
FIG. 13A is a view illustrating one example of the initial reference RGB value.
FIG. 13B is a scatter diagram of which the initial reference RGB values RdGdBd are plotted.

After the reference patch of the reference sheet KS and each patch of the reference chart KC are imaged with the image capturing unit 30, the image forming device 1 causes the calculating unit 124 of the color measurement control unit 106 to store the imaging reference RGB value, which is the RGB value of which the image data obtained by imaging the reference patch of the reference sheet KS is processed with the data processing unit 110, that is, the device dependent signal dependent on a device in the memory table Tb1 of the non-volatile memory 125 in correspondence with the patch number, that is, in correspondence with the reference color measurement value, as illustrated in FIG. 12, and to store the initial reference RGB value RdGdBd, which is the RGB value of which the initial reference color patch of the reference chart KC is read and processed with the data processing unit 110, in the non-volatile memory 125, as illustrated in FIG. 13A.

The calculating unit 124 calculates an average value for every predetermined region (region to be performed with color measurement) among the image data of the initial reference color batch of the reference chart KC read by the image capturing unit 30 to obtain the initial reference RGB value RdGdBd. The influence of noise can be reduced and the bit resolution can be enhanced by averaging a great number of pixels in the region to be performed with color measurement to calculate the initial reference RGB value. FIG. 13B is a scatter diagram of which the initial reference RGB values RdGdBd are plotted, and FIG. 13A illustrates a state of which the reference Lab value Ldadbd, of which the initial reference RGB value RdGdBd is converted to Lab value, and the reference XYZ value xdydzd, of which the reference Lab value Ldadbd is converted to XYZ value, are also registered in the non-volatile memory 125.

When the image forming device 1 stores the reference color measurement value, the imaging reference RGB value, and the initial reference RGB value RdGdBd in the non-volatile memory 125, the color measurement value calculating unit 126 of the calculating unit 124 calculates a reference value linear transformation matrix for mutual conversion on the pair of XYZ value of the reference color measurement value and the imaging RGB value stored in the non-volatile memory 125, that is, the pair of XYZ value and the imaging reference RGB value of the same patch number, and stores the calculated reference value linear transformation matrix in the non-volatile memory 125.

In this state, the image forming device 1 causes the CPU 101 to perform the main-scanning movement control of the carriage 6, the conveying control of the recording medium P by the paper conveying unit 48, and the drive control of the print head 20 based on the image data, print setting and the like input from outside, and controls the ink discharge from each print head 20y, 20m, 20c, 20k of the print head 20 while intermittently conveying the recording medium P to record and output the image on the recording medium P.

In this case, the discharging amount of ink from the print head 20y, 20m, 20c, 20k sometimes changes due to properties unique to the device, temporal change and the like, where the image is formed with a color different from the color of the image intended by the user if the discharging amount of ink is changed, whereby the color reproducibility degrades.

The image forming device 1 thus executes the color adjustment processing for obtaining the color measurement value and performing color adjustment based on the color measurement value at a predetermined color adjustment processing timing.

In other words, when the color adjustment processing timing is reached, the image forming device 1 forms a plurality of color patches (color measurement adjustment color patch) CP on the recording medium P with the print head 20 and records and outputs the same as the color measurement adjustment sheet CS, as illustrated in FIG. 14. The color measurement adjustment sheet CS is such that the color measurement adjustment color patch CP, which is a plurality of color patches for color measurement adjustment, is formed and output by the print head 20, and the color measurement adjustment color patch CP reflecting the output properties in the color adjustment processing timing of the image forming device 1, in particular, the output properties of the print head 20 is formed. The color patch data of the color measurement adjustment color patch CP is stored in advance in the non-volatile memory 125, and the like.

As will be described later, the image forming device 1 converts the measurement target RGB value to the initial reference RGB value RdGdBd with the RGB value of imaging a plurality of color measurement adjustment color patches CP of the color measurement adjustment sheet CS as the color measurement target RGB value (color measurement RGB value), selects the reference color measurement value (proximate reference color measurement value) that is close in terms of distance to the color measurement value of which the initial reference RGB value RdGdBd is converted among the reference color measurement values registered in the memory table Tb1 of the non-volatile memory 125, obtains the color measurement value for converting the color measurement target RGB value to the selected proximate reference color measurement value, and outputs the image with the print head 20 based on the image of after the color conversion is performed based on the relevant color measurement value, whereby the color reproducibility of the formed image by the image forming device 1 enhances.

As illustrated in FIG. 14, the image forming device 1 images a plurality of color measurement adjustment color patches CP of the color measurement adjustment sheet CS on the platen 14 with the image capturing unit 30 while controlling the movement of the carriage 6, and at the same time, images the patch of the reference chart KC with the image capturing unit 30 in a state the color measurement adjustment sheet CS is set on the platen 14 or the color measurement adjustment sheet CS is held on the platen 14 without being discharged at the recorded stage. After simultaneously imaging the color measurement adjustment color patch CP of the color measurement adjustment sheet CS and the patch Pa of the reference chart KC with the image capturing unit 30, the image forming device 1 performs the necessary image processing on the image data of the color measurement adjustment color patch CP of the color measurement adjustment sheet CS and the image data of the patch Pa of the reference chart KC in the data processing unit 110 of the image capturing unit 30, and then transmits to the color measurement control unit 106 the image data (RGB value) of the color measurement adjustment color patch CP of the color measurement adjustment sheet CS as the color measurement target RGB value, that is, the device dependent signal that depends on the device, and the image data (RGB value) of the patch Pa of the reference chart KC as the color measurement reference RGB value RdsGdsBds, and the color measurement control unit 106 temporarily saves the same in the frame memory 121 (step S11), as illustrated in FIG. 14.

The color measurement control unit 106 causes the color measurement value calculating unit 126 of the calculating unit 124 to transform the color measurement target RGB value saved in the frame memory 121 to an initialization color measurement target RGB value RsGsBs using an inter-reference RGB linear transformation matrix to be described later (step S12, S13).

The calculating unit 124 of the color measurement control unit 106 executes a basic color measurement processing, to be described later, with the transformed initialization color measurement target RGB value RsGsBs as the color measurement target RGB value (step S14), and acquires a Lab color measurement value (step S15).

Figure 15:
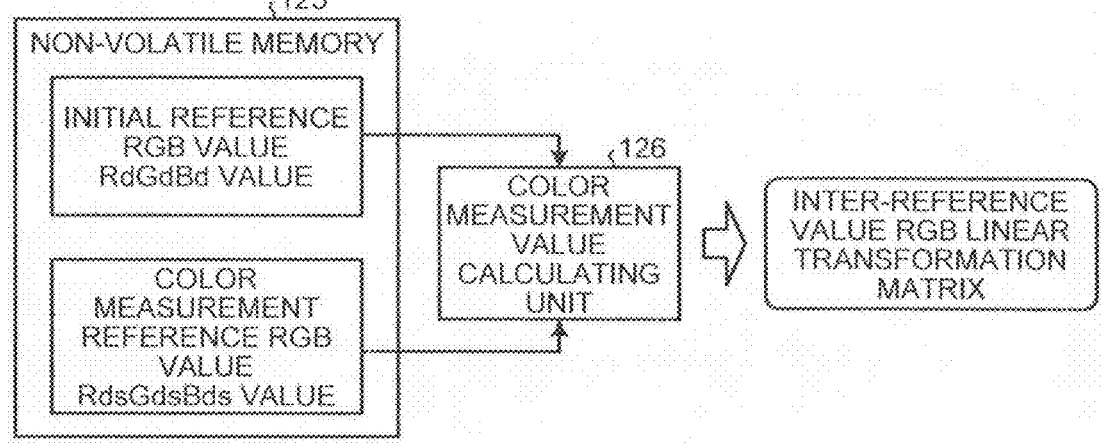
FIG. 15 is an explanatory view of an inter-reference value RGB linear transformation generation processing.
Figure 16:
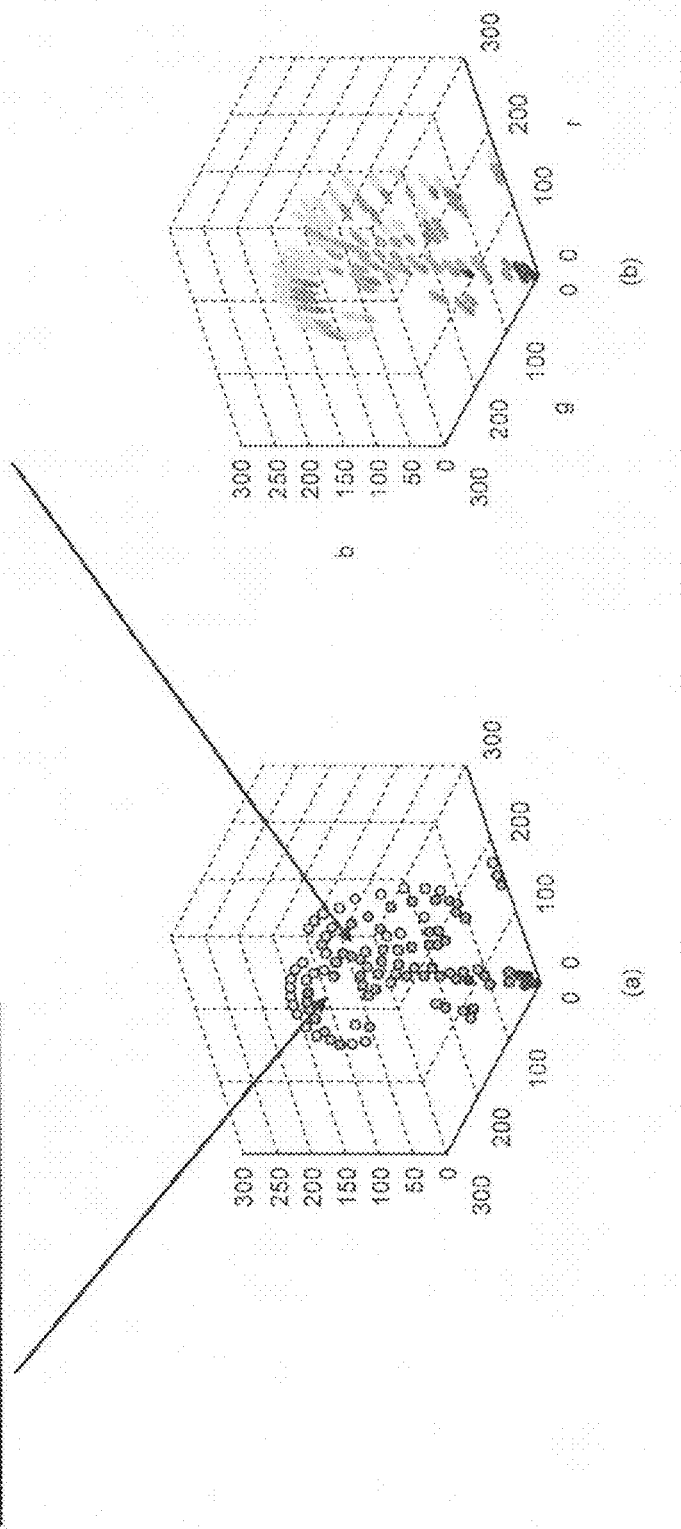
FIG. 16 is a view illustrating a relationship of an initial reference RGB value and a color measurement reference RGB value.

In the image forming device 1 of the present embodiment, the color measurement value calculating unit 126 of the calculating unit 124 obtains the inter-reference RGB linear transformation matrix as illustrated in FIGS. 15 and 16.

In other words, as illustrated in FIG. 15, the color measurement value calculating unit 126 of the calculating unit 124 reads out from the non-volatile memory 125 the initial reference RGB value RdGdBd of which the patch of the reference chart KC is imaged at the same time as when the reference color patch KP of the reference sheet KS is imaged with the image capturing unit 30 at the beginning and stored in the non-volatile memory 125, and the color measurement reference RGB value RdsGdsBds of which the patch of the reference chart KC is imaged at the same time as when the color measurement adjustment color patch CP of the color measurement adjustment sheet CS is imaged with the image capturing unit 30 at the time of color measurement and stored in the non-volatile memory 125, obtains the inter-reference RGB linear transformation matrix for transforming the color measurement reference RGB value RdsGdsBds to the initial reference RGB value RdGdBd, and stores the obtained reference RGB linear transformation matrix in the non-volatile memory 125.

In other words, in FIG. 16, the white points illustrated in FIG. 16(a) are the points in which the initial reference RGB values RdGdBd are plotted in the rgb space, and the black points are the points in which the color measurement reference RGB values RdsGdsBds are plotted in the rgb space. As apparent from FIG. 16(a), the value of the color measurement reference RGB value RdsGdsBds is fluctuated from the value of the initial reference RGB value RdGdBd, and the fluctuating direction in the rgb space is substantially the same as illustrated with an arrow in FIG. 16(b) but the shifting direction differs by hue. Therefore, the reason the RGB value fluctuates even if the patch of the same reference chart KC is imaged includes temporal change of the illumination light source 37, temporal change of the two-dimensional image sensor 35, and the like.

Therefore, if the color measurement value is obtained using the color measurement target RGB value when the color measurement adjustment patch CP of the color measurement adjustment sheet CS is imaged while fluctuating when the patch of the same reference chart KC is imaged, the color measurement value may contain error by the amount of fluctuation.

The image forming device 1 of the present embodiment thus uses a method of least squares between the initial reference RGB value RdGdBd and the color measurement reference RGB value RdsGdsBds to obtain the inter-reference RGB linear transformation matrix for transforming the color measurement reference RGB value RdsGdsBds to the initial reference RGB value RdGdBd, and uses the relevant inter-reference RGB linear transformation matrix to transform the color measurement target RGB value obtained by imaging the color measurement adjustment color patch CP of the color measurement adjustment sheet CS with the image capturing unit 30 and storing in the non-volatile memory 125 to the initialization color measurement target RGB value RsGsBs, and executes the basic color measurement processing, to be described later, with the transformed initialization color measurement target RGB value RsGsBs as the color measurement target RGB value to acquire the Lab color measurement value.

The inter-reference RGB linear transformation matrix may not be one-order and may be a nonlinear matrix of higher order, where the high-order matrix is adopted when the non-linearity is high between the rgb space and the XYZ space to enhance the transformation accuracy.

When imaging the reference color patch KP of the reference sheet KS and the color measurement adjustment color patch CP of the color measurement adjustment sheet CS serving as the subject through the opening 33a formed in the bottom surface 32a, the image capturing unit 30 simultaneously images the patch Pa of the reference sheet KS arranged in the recess 32c of the bottom surface 32a of the housing 32, so that the reference color patch KP of the reference sheet KS and the color measurement adjustment color patch CP of the color measurement adjustment sheet CS having the patch Pa of the reference sheet KS and as the subject can be imaged always at the same positional relationship, whereby imaging can be carried out in a stable state.

Furthermore, the image capturing unit 30 has the concave lens 41 fitted into the opening 33a in the optical path of the reference color patch KP of the reference sheet KS and the color measurement adjustment color patch CP of the color measurement adjustment sheet CS serving as the subject through the opening 33a and the two-dimensional image sensor 35.

The image capturing unit 30 has the curvature of the concave lens 41 set such that the optical path length (focal length) from the reference color patch KP of the reference sheet KS, which is the imaging surface, and the color measurement adjustment color patch CP of the color measurement adjustment sheet CS, which is the subject, to the image sensor unit 34 matches the optical path length (focal length) from the reference chart KC to the image sensor unit 34, so that the focus position of the reference chart KC and the focus position of the subject (reference color patch KP of the reference sheet KS and the color measurement adjustment color patch CP of the color measurement adjustment sheet CS) with respect to the image sensor unit 34 can be matched.

Therefore, the reference color patch KP of the reference sheet KS and the color measurement adjustment color patch CP of the color measurement adjustment sheet CS, as well as the reference chart KC serving as a comparison target thereof can always be stably imaged at high accuracy and at the same accuracy.

The image capturing unit 30 can simultaneously image the reference chart KC and the imaging surface of the recording medium P under the same illumination condition, where the illumination light that irradiates the imaging surface of the recording medium P through the concave lens 41 and the opening 33a and the illumination light that irradiates the reference chart KC are illumination light from the same illumination light source 37.

Figure 17:
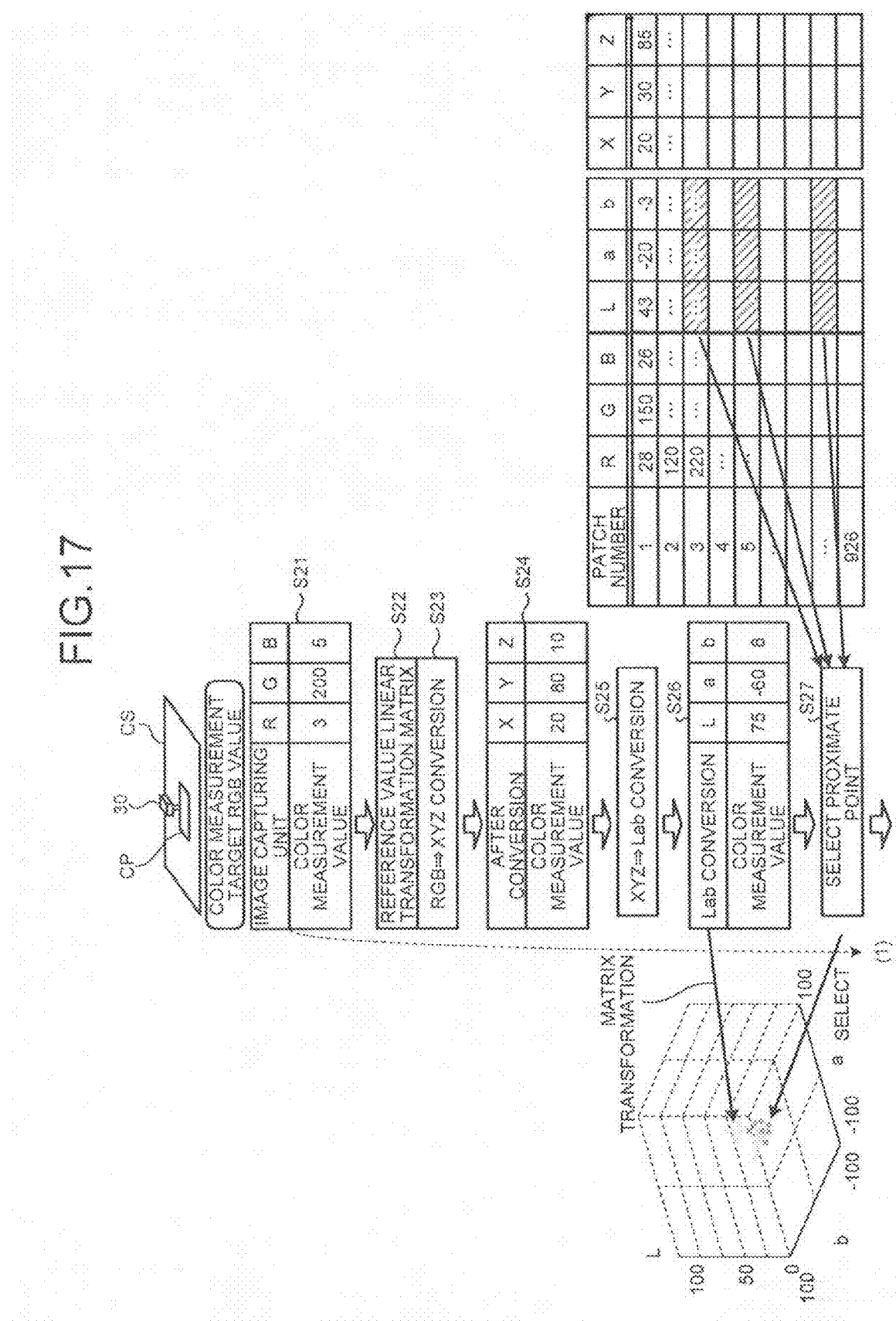
FIG. 17 is an explanatory view of a basic color measurement processing.
Figure 18:
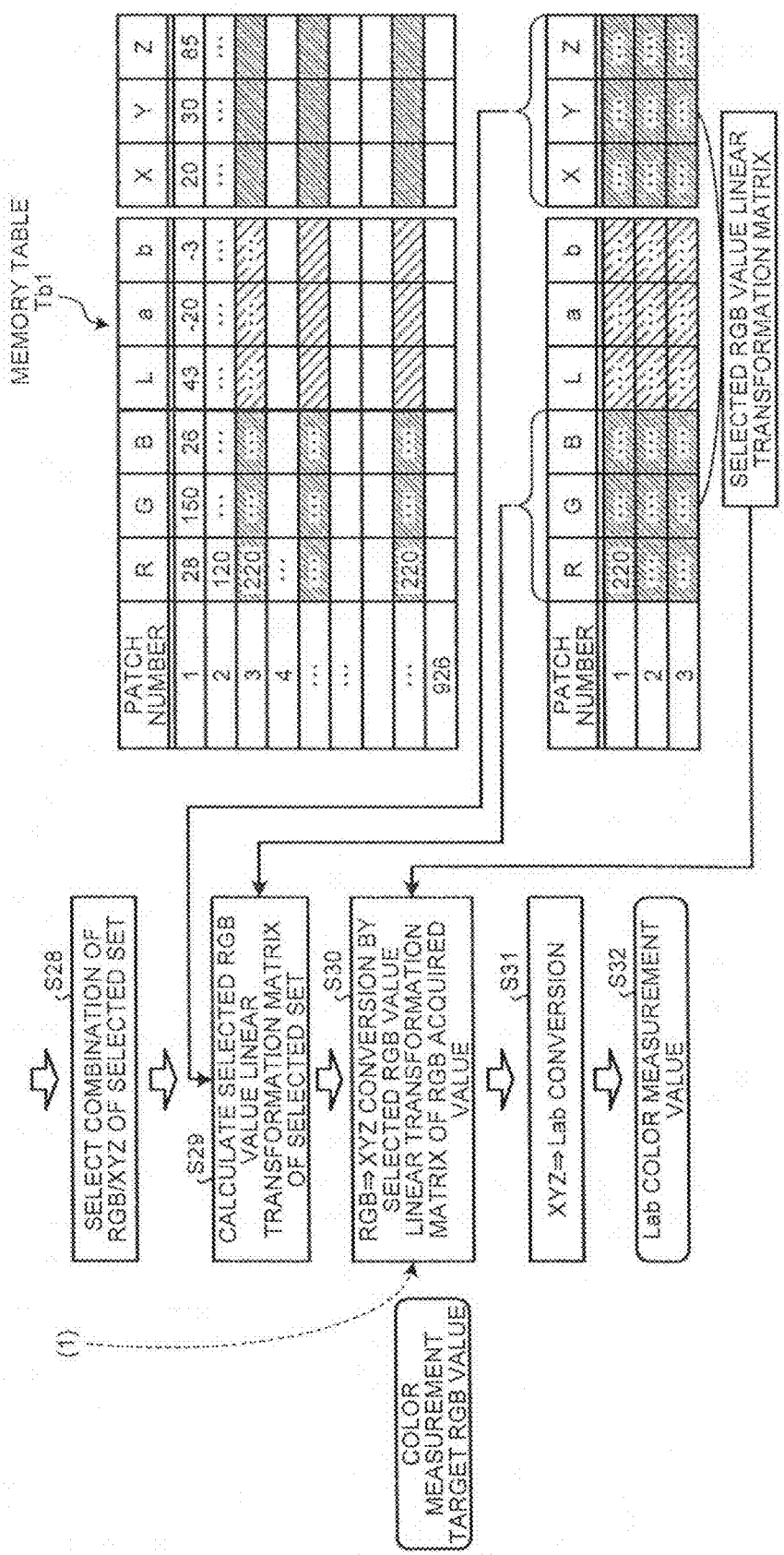
FIG. 18 is a view illustrating the basic color measurement processing following FIG. 17.

After obtaining the initial color measurement target RGB value RsGsBs and assuming as the color measurement target RGB value as described above, the image forming device 1 selects the proximate reference color measurement value (proximate reference color measurement value) close in terms of distance to the color measurement value transformed to the color measurement target RGB value among the reference color measurement values registered in the memory table Tb1 of the non-volatile memory 125, as illustrated in FIGS. 17 and 18, executes the basic color measurement processing of obtaining the color measurement value for converting the color measurement target RGB value to the selected proximate reference color measurement value, and outputs the image by the print head 20 based on the image data of after the color conversion is performed based on the color measurement value to enhance the color reproducibility of the formed image by the image forming device 1.

In other words, as illustrated in FIG. 17, the image forming device 1 images the color measurement adjustment color patch CP of the color measurement adjustment sheet CS to obtain the initial color measurement target RGB value RsGsBs as described above, stores the same in the non-volatile memory 125 as the color measurement target RGB value (step S21), uses the reference value linear transformation matrix (step S22) to transform to the first XYZ value (step S23) and stores the same in the non-volatile memory 125 (step S24). For example, in FIG. 17, the color measurement value calculating unit 126 converts the color measurement target RGB value (3, 200, 5) of the image capturing unit 30 to the first XYZ value (first color measurement value) of (20, 80, 10), and stores the same in the non-volatile memory 125.

The color measurement value calculating unit 126 references the memory table Tb1 of the non-volatile memory 125 or uses a known conversion equation to convert the first XYZ value to the first Lab value (first color measurement value) (step S25), and stores the same in the non-volatile memory 125 (step S26). For example, in FIG. 17, the color measurement value calculating unit 126 converts the first XYZ value (20, 80, 10) to the first Lab value (75, −60, 8), which is the imaging color measurement value.

The color measurement value calculating unit 126 then searches for the reference color measurement value (Lab value) of the color patch of a plurality of colors in the memory table Tb1 stored in the non-volatile memory 125 and selects a set of color patches (proximate color patches) close in distance to the first Lab value on the L*a*b* space (step S27), as illustrated in the L*a*b* space of FIG. 17. For example, in the diagram of the L*a*b* space of FIG. 17, a diagram in which 60 color patches are selected and plotted on the L*a*b* space is illustrated, and a method of selecting the patches close in distance includes calculating the distance between the first Lab value and all points in the reference color measurement value (Lab value) of the plurality of color patches, and selecting the reference Lab value (hatched reference Lab value in FIG. 17) of the color patches close in distance to the first Lab value, which is the first color measurement value, for example.

As illustrated in FIG. 18, the color measurement value calculating unit 126 references the memory table Tb1 to select the combination of the imaging reference RGB value in pair with the first Lab value of the selected set, that is, the imaging reference RGB value (selected RGB value) of the same patch number as the first Lab of the selected set and the reference XYZ value (step S28), obtains using the method of least squares a selected RGB value linear transformation matrix for transforming between the sets of the imaging reference RGB value of the selected combination (selected set) and the reference XYZ value, and stores the obtained selected RGB value linear transformation matrix in the non-volatile memory 125 (step S29).

The color measurement value calculating unit 126 obtains the color measurement target RGB value in which each color measurement adjustment color patch CP of the color measurement adjustment sheet to be performed with color measurement is imaged with the image capturing unit 30 and digitally converted with the A/D converter 112 and the second XYZ value, which is the second color measurement value, using the selected RGB value linear transformation matrix (step S30), converts the second XYZ value to the second Lab value using the known conversion equation (step S31), and acquires the final color measurement value (step S32).

The color measurement value calculating unit 126 performs image adjustment based on the image data on which color conversion is performed using the obtained color measurement value, and drives the print head 20 based on the image adjusted image data to form the image.

In other words, the image forming device 1 of the present embodiment obtains the color measurement target RGB value acquired when a plurality of color measurement adjustment color patches CP of the color measurement adjustment sheet CS reflecting the output properties of the print head 20 at the color adjustment processing timing is imaged and the first Lab value acquired when the reference sheet KS is imaged in an initial state using the reference value linear transformation matrix, selects a set of patches with the reference Lab value close in distance to the first Lab value in the L*a*b* space among the reference Lab values of the patches of a plurality of colors registered in the memory table Tb1, and converts the color measurement target RGB value corresponding to the selected reference Lab value to the Lab value using the selected RGB value linear transformation matrix to obtain the Lab color measurement value. The color measurement value calculating unit 126 performs image adjustment based on the image data on which color conversion is performed using the obtained color measurement value, and drives the print head 20 based on the image adjusted image data to form the image.

Figure 20A:
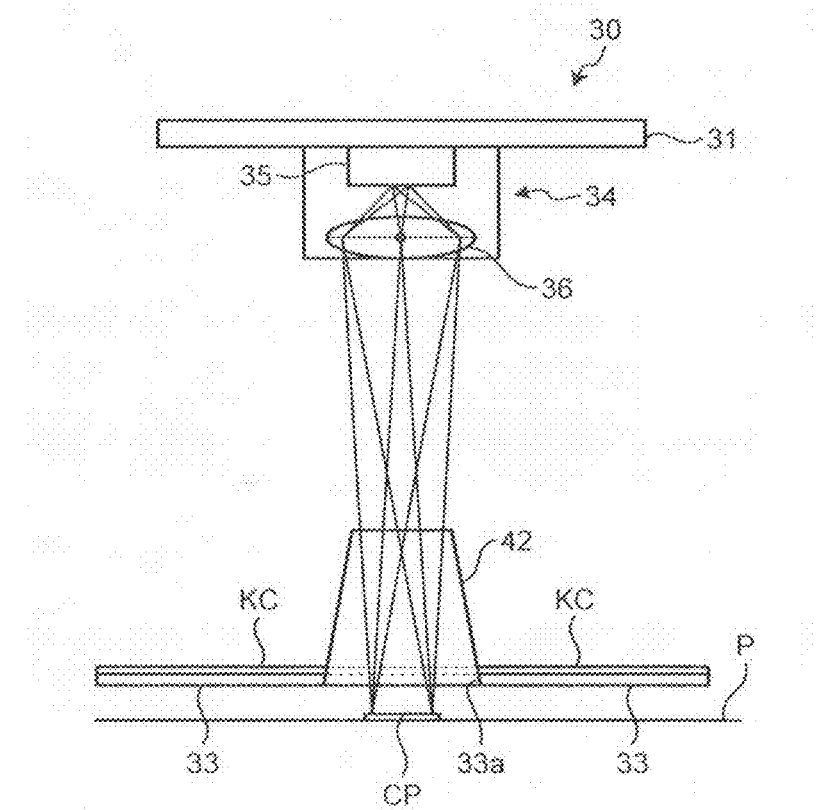
FIG. 20A is an explanatory view of the optical path length in the image capturing unit using the transmissive member as the optical path length changing member.
Figure 20B:
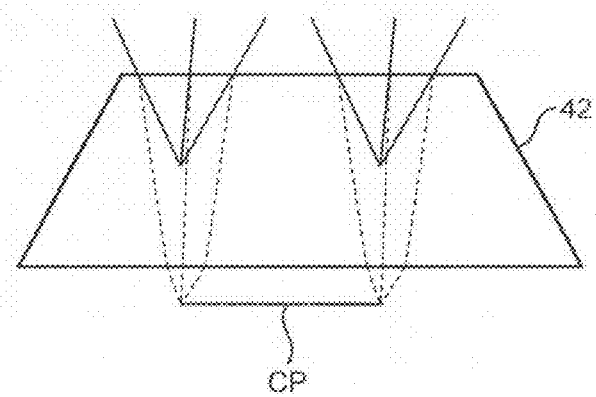
FIG. 20B is an enlarged view of the portion of the transmissive member.

In the description made above, a case in which the concave lens 41 is arranged as an optical path length changing member for changing the optical path length on the optical path of the imaging target passing through the opening 33a and the image sensor unit 34, but the optical path length changing member for changing the optical path length is not limited to the concave lens 41, and a transmissive member 42 having a predetermined index of refraction may be arranged, for example, as illustrated in FIGS. 19, 20A and 20B.

In this case, as illustrated in FIGS. 19, 20A and 20B, the image capturing unit 30 has the transmissive member 42 fitted into the opening 33a of the holding member 33, and the transmissive member 42 is imaged in a state (state in which the optical path length is changed) the focal length of the imaging target is extended from a position illustrated with a solid line in FIG. 20B (focal length in which the transmissive member 42 is not arranged) to a position of the imaging target illustrated with a broken line, as illustrated in FIG. 20B in which the portion of the transmissive member 42 in the imaging through the transmissive member 42 of FIG. 20A is enlarged. Although not illustrated, the transmissive member 42 is fitted to the opening 33a of the holding member 33 while accurately determining the position by fitting the transmissive member 42 and a projection formed in a peripheral direction of the opening 33a of the holding member 33 to the recess formed in the other member 42, 33.

In other words, the index of refraction of the transmissive member 42 is set such that the optical path length (focal length) from the reference color patch KP of the reference sheet KS, which is the imaging surface, and the color measurement adjustment color patch CP of the color measurement adjustment sheet CS, which is the subject, to the image sensor unit 34 and the optical path length (focal length) from the reference chart KC to the image sensor unit 34 match.

Therefore, the focus position of the reference chart KC and the focus position of the subject (reference color patch KP of the reference sheet KS and the color measurement adjustment color patch CP of the color measurement adjustment sheet CS) with respect to the image sensor unit 34 can be matched.

Figure 21:
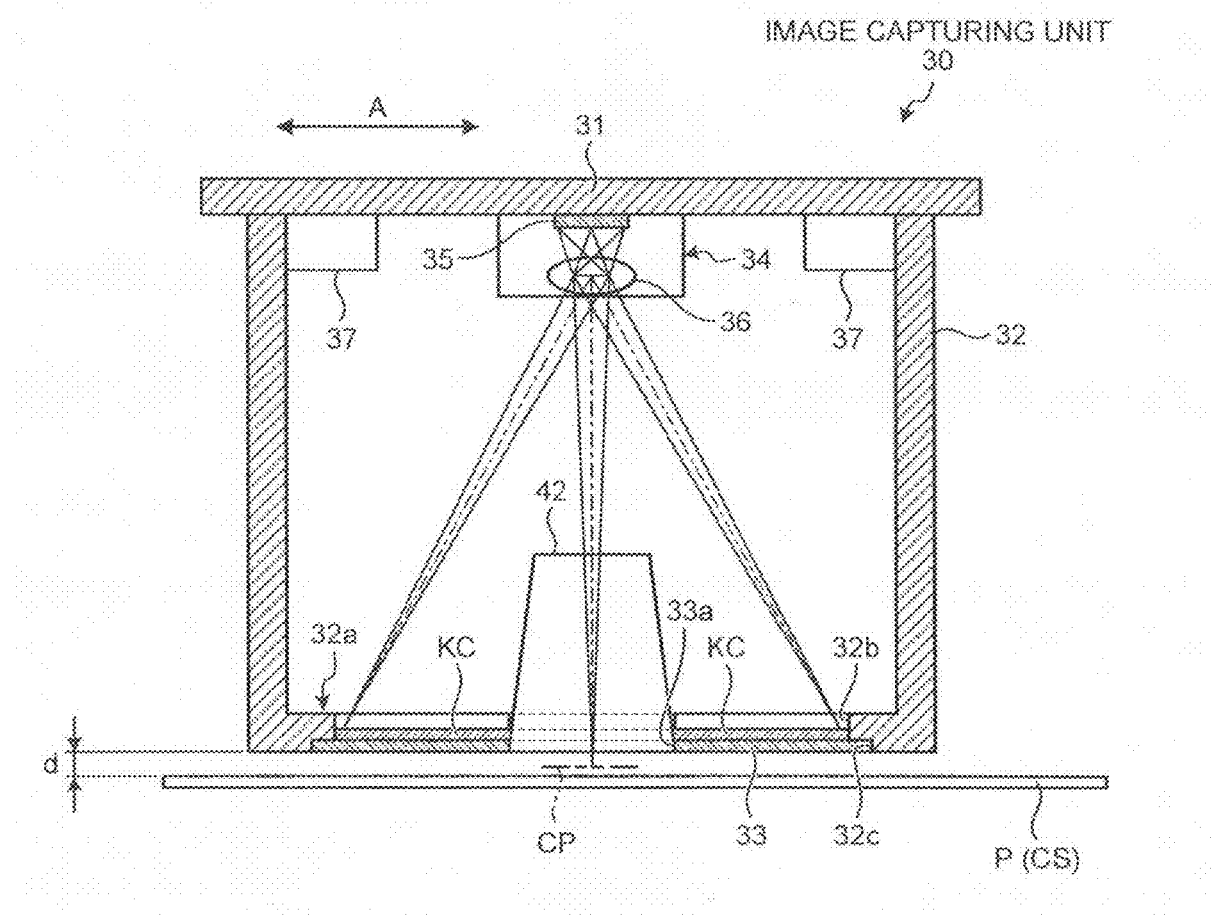
FIG. 21 is a front cross-sectional view of the relevant portion of the image capturing unit in which the transmissive member is arranged on the bottom surface formed with the opening.

Even when the transmissive member 42 is used, the method of arranging the transmissive member 42 on the optical path of the imaging target passing through the opening 33a and the image sensor unit 34 is not limited to arranging by being fitted into the opening 33a of the holding member 33, and the transmissive member 42 may be arranged on the holding member 33 at the periphery of the opening 33a, as illustrated in FIG. 21, for example. Accordingly, the position of the transmissive member 42 can be simply and easily determined. When arranging at an appropriate position between the opening 33a and the image sensor unit 34, it needs to be at the position and have a shape (cone shape, etc.) that does not become a hindrance of the optical path for imaging the reference chart KC, and the index of refraction of the transmissive member 42 needs to accord with the arrangement position.

As above described, in the image forming device 1 of the present embodiment, the image capturing unit 30 includes the sensor unit 34 that captures a predetermined area including a subject; the reference chart KC that is arranged in the predetermined area and captured together with the subject by the sensor unit 34; the concave lens 41 or the transmissive member 42 (optical path length changing member for the subject) that is arranged on the optical path extending from the subject to the sensor unit 34 and is capable of changing a length of the optical path.

Therefore, both the subject and the reference chart KC can be stably imaged, the optical path length of the subject and the reference chart KC with respect to the image sensor unit 34 can be appropriately adjusted, and the subject and the reference chart KC can always be imaged at high accuracy in a stable positional relationship.

In the image capturing unit 30 of the present embodiment, the opening 33a is formed in the holding member 33 serving as the opposing surface attached to the bottom surface 32 of the housing 32 at the position facing the image sensor unit 34, and the optical path length changing member is the concave lens 41 arranged on the optical path of the image sensor unit 34 and the opening 33a.

Therefore, the optical path length of the subject and the reference chart imaged through the opening 33a can be adjusted appropriately and inexpensively, and the subject and the reference chart KC can be imaged at high accuracy in an inexpensive and more stable positional relationship.

Furthermore, in the image capturing unit 30 of the present embodiment, the opening 33a is formed in the holding member 33 serving as the opposing surface attached to the bottom surface 32a of the housing 32 at the position facing the image sensor unit 34, and the optical path length changing member for the subject is the transmissive member 42 being arranged on the optical path of the image sensor unit 34 and the opening 33a and having a predetermined index of refraction.

Therefore, according to the transmissive member 42, the optical path length of the subject and the reference chart imaged through the opening 33a can be adjusted appropriately and inexpensively, and the subject and the reference chart KC can be imaged at high accuracy in an inexpensive and more stable positional relationship on a constant basis.

Furthermore, the image capturing unit 30 of the present embodiment is arranged with the concave lens 41 or the transmissive member 42, which is the optical path length changing member for the subject, embedded in the opening 33a or arranged on the opening 33a.

Therefore, the optical path length of the subject and the reference chart KC imaged through the opening 33a can be adjusted appropriately and inexpensively, and the subject and the reference chart KC can be imaged at high accuracy in an inexpensive and more stable positional relationship on a constant basis.

The image forming device of the present embodiment is mounted with the image capturing unit (image capturing unit) 30 for simultaneously imaging the reference chart KC including a plurality of colors and an arbitrary subject, and a color measuring device for calculating the color measurement value of the subject with the color measurement control unit 106 based on the imaged data of the subject and the reference chart KC imaged with the image capturing unit 30.

Therefore, even if the color measurement RGB value when the color measurement adjustment patch CP is imaged changes by temporal change of the image capturing unit 30 and the like, such change can be corrected, the portion having linearity in the color measurement adjustment patch CP can be extracted and linearly converted to obtain the color measurement value, and the color reproduction with suppressed distortion can be achieved inexpensively and more stably.

In the example described above, the large opening 32b is formed at the bottom surface 32a of the housing 32, the opening 33a is formed at the center thereof to detachably attach the holding member 33 mounted with the reference chart KC, and the concave lens 41 or the transmissive member 42 serving as the optical path length changing member for the subject is arranged in the opening 33a, but the arrangement of the opening 33a and the reference chart KC, and the like is not limited to the configuration described above.

Figure 22:
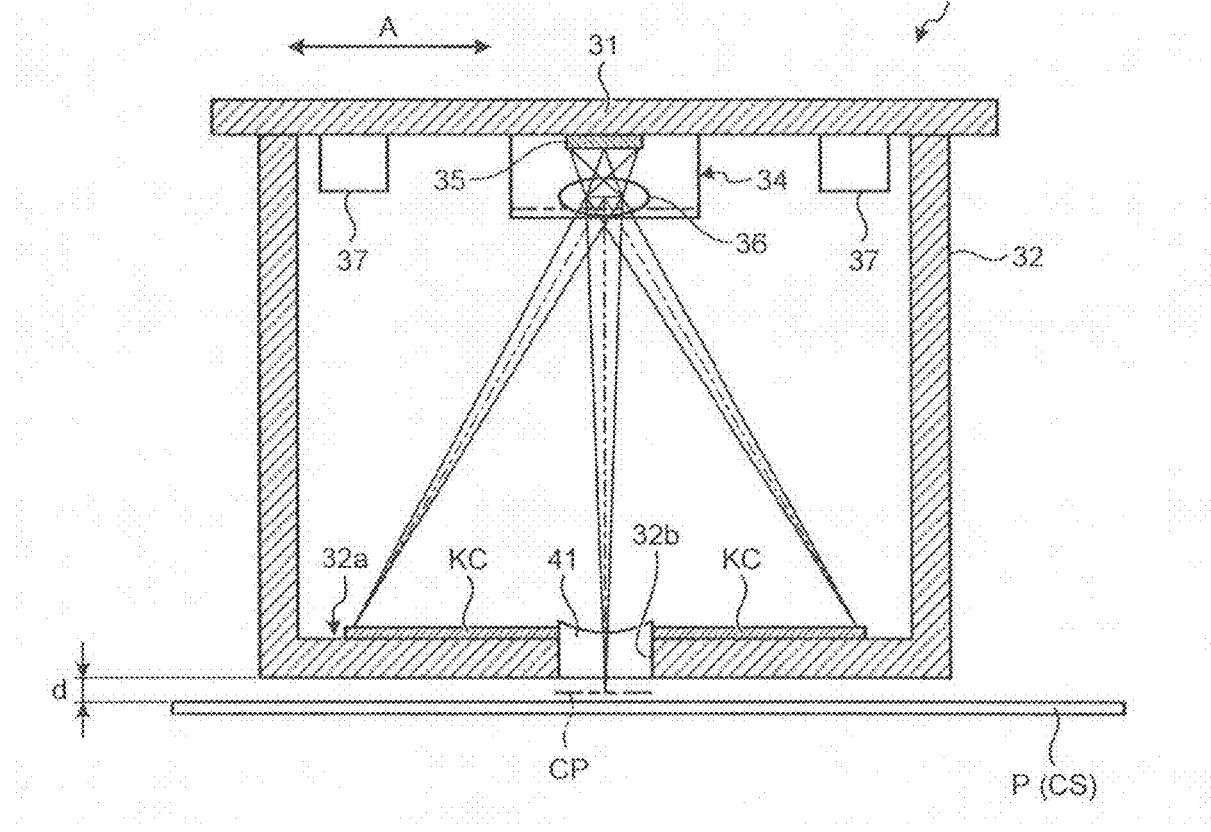
FIG. 22 is a front cross-sectional view of the image capturing unit in which the concave lens is fitted to the opening formed in the bottom surface itself of the housing.
Figure 23:
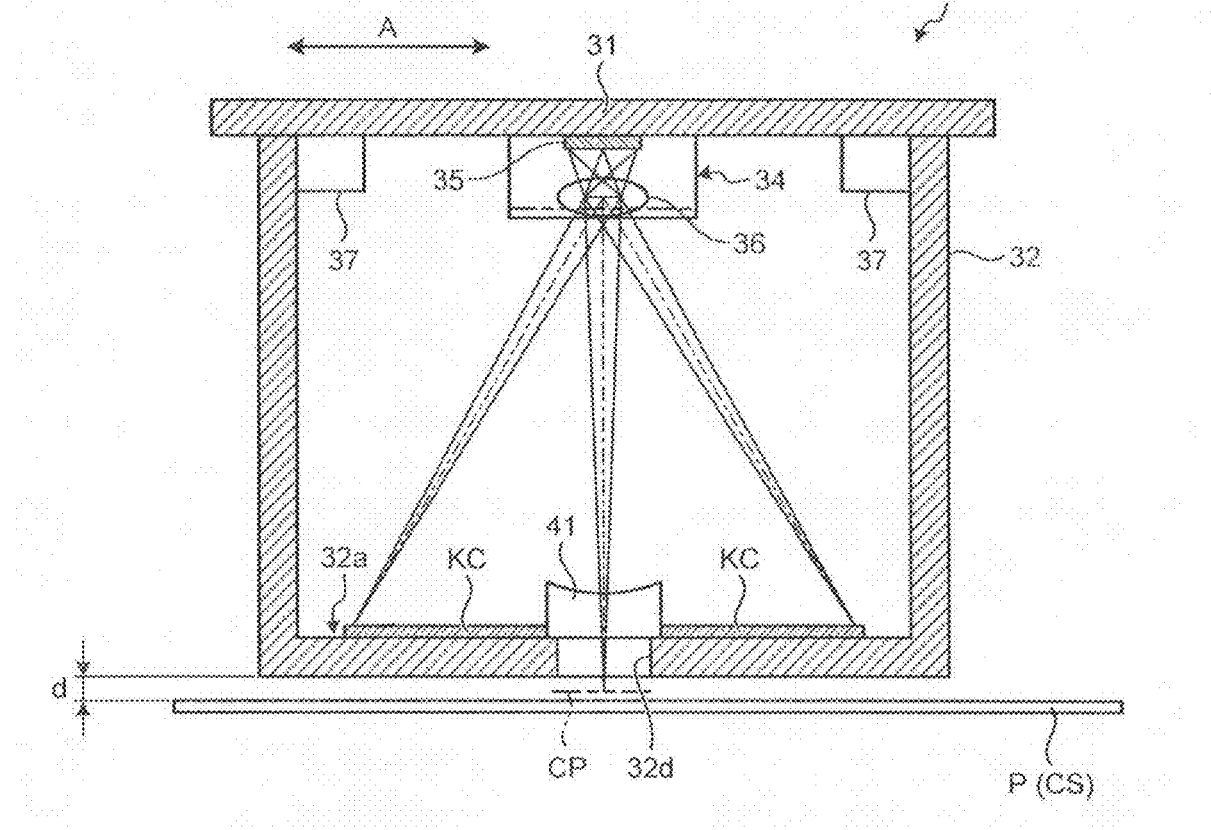
FIG. 23 is a front cross-sectional view of the image capturing unit in which the concave lens is arranged on the opening formed in the bottom surface itself of the housing.
Figure 24:
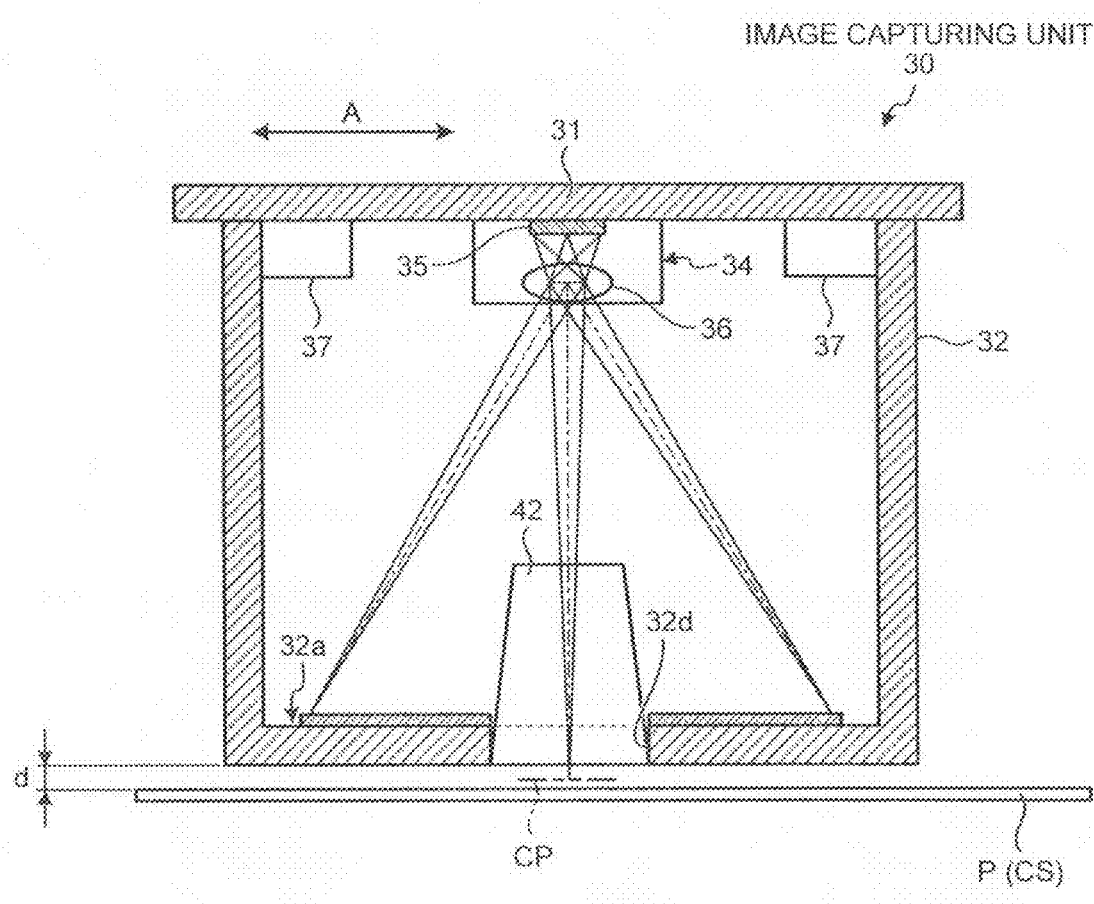
FIG. 24 is a front cross-sectional view of the image capturing unit in which the transmissive member is fitted to the opening formed in the bottom surface itself of the housing.
Figure 25:
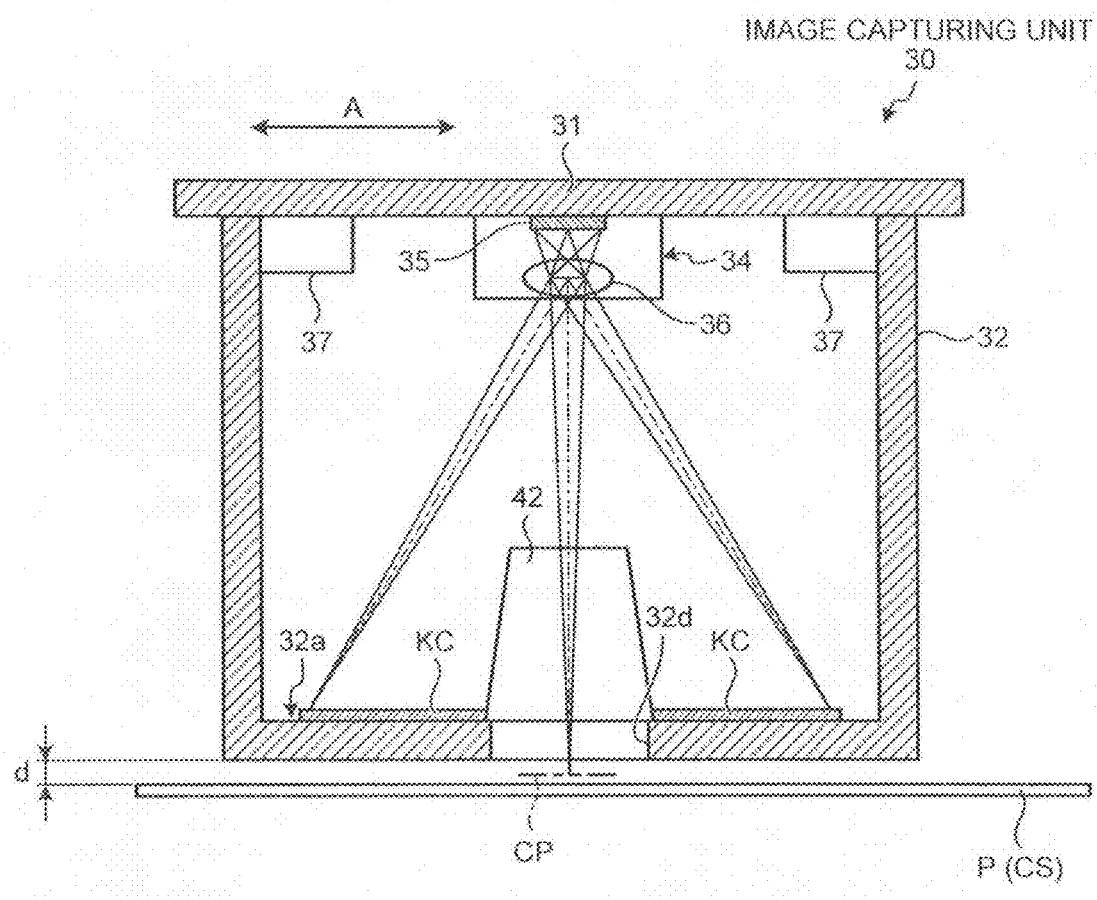
FIG. 25 is a front cross-sectional view of the image capturing unit in which the transmissive member is arranged on the opening formed in the bottom surface itself of the housing.

For example, as illustrated in FIGS. 22 to 25, an opening 33d for imaging may be formed at the bottom surface 32a itself of the housing 32, and the optical path length changing member may be arranged in the opening 33d. In other words, the concave lens 41, which is the optical path length changing member, may be fitted into the opening 32d formed at the bottom surface 32a of the housing 32, as illustrated in FIG. 22, or the concave lens 41 may be arranged on the opening 32d formed at the bottom surface 32a, as illustrated in FIG. 23. The transmissive member 42, which is the optical path length changing member, may be fitted into the opening 32d formed at the bottom surface 32a of the housing 32, as illustrated in FIG. 24, or may be arranged on the bottom surface 32a at the portion the opening 32d is formed, as illustrated in FIG. 25.

Figure 26:
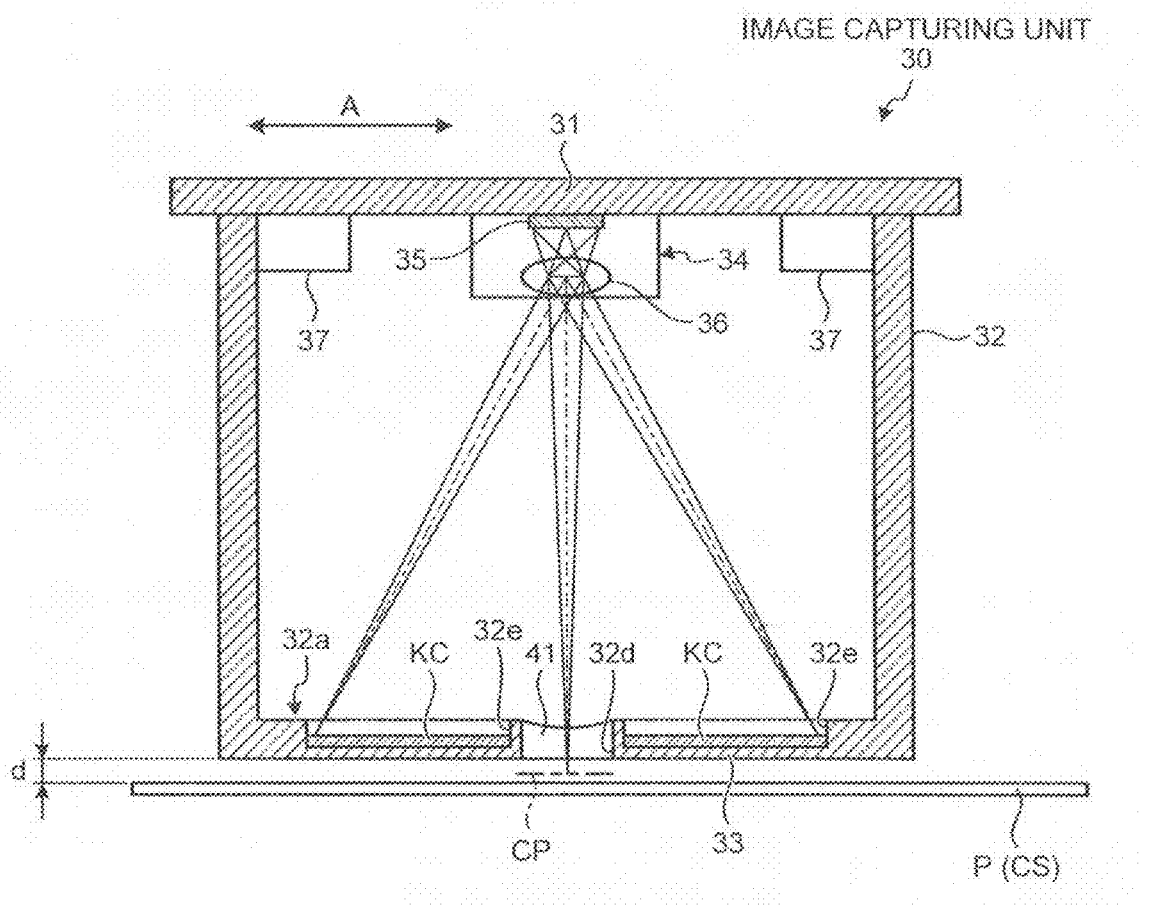
FIG. 26 is a front cross-sectional view of the image capturing unit in which an opening and a recess are formed at the bottom surface of the housing and the concave lens is fitted to the opening.
Figure 27:
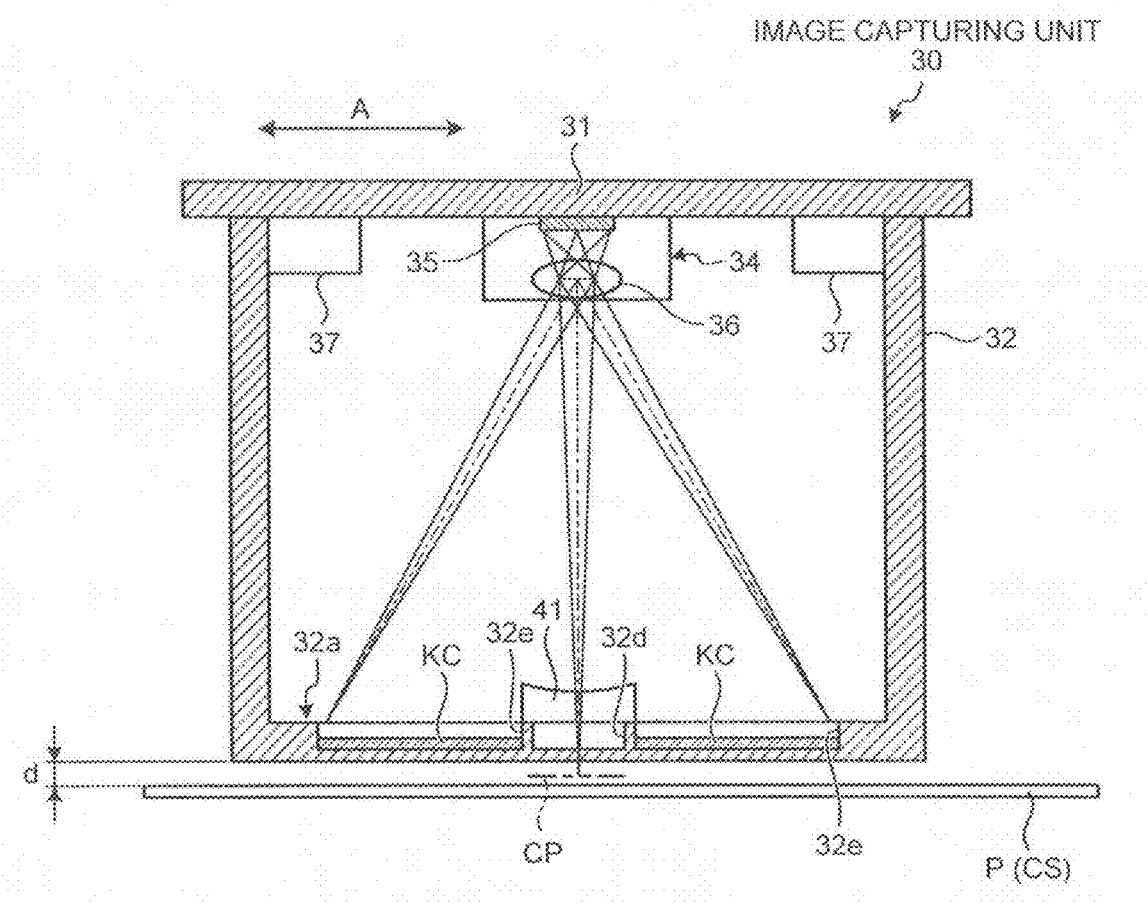
FIG. 27 is a front cross-sectional view of the image capturing unit in which an opening and the recess are formed at the bottom surface of the housing and the concave lens is fitted to the opening.
Figure 28:
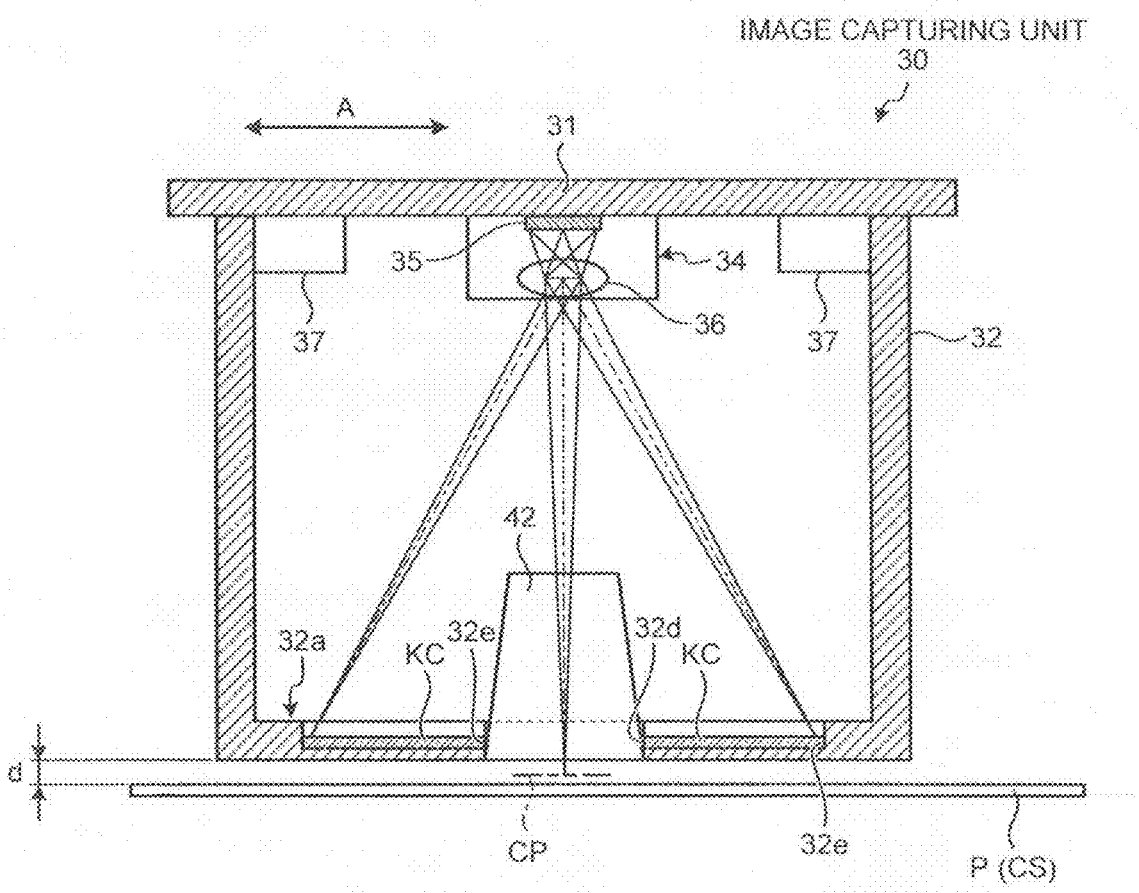
FIG. 28 is a front cross-sectional view of the image capturing unit in which the transmissive member is fitted to the opening of the bottom surface.

In this case, the opening 32d is formed at the bottom surface 32a of the housing 32, and the recess 32e of a predetermined width is formed at the outer peripheral part of the opening 32d on the upper surface of the bottom surface 32a to detachably arrange the reference chart KC in the recess 32e, as illustrated in FIGS. 26 to 29. In this case as well, the concave lens 41, which is the optical path length changing member, may be fitted into the opening 32d formed at the bottom surface 32a of the housing 32, as illustrated in FIG. 26, or may be arranged on the opening 32d formed at the bottom surface 32a, as illustrated in FIG. 27. The transmissive member 42, which is the optical path length changing member, may be fitted into the opening 32d formed at the bottom surface 32a of the housing 32, as illustrated in FIG.

Figure 29:
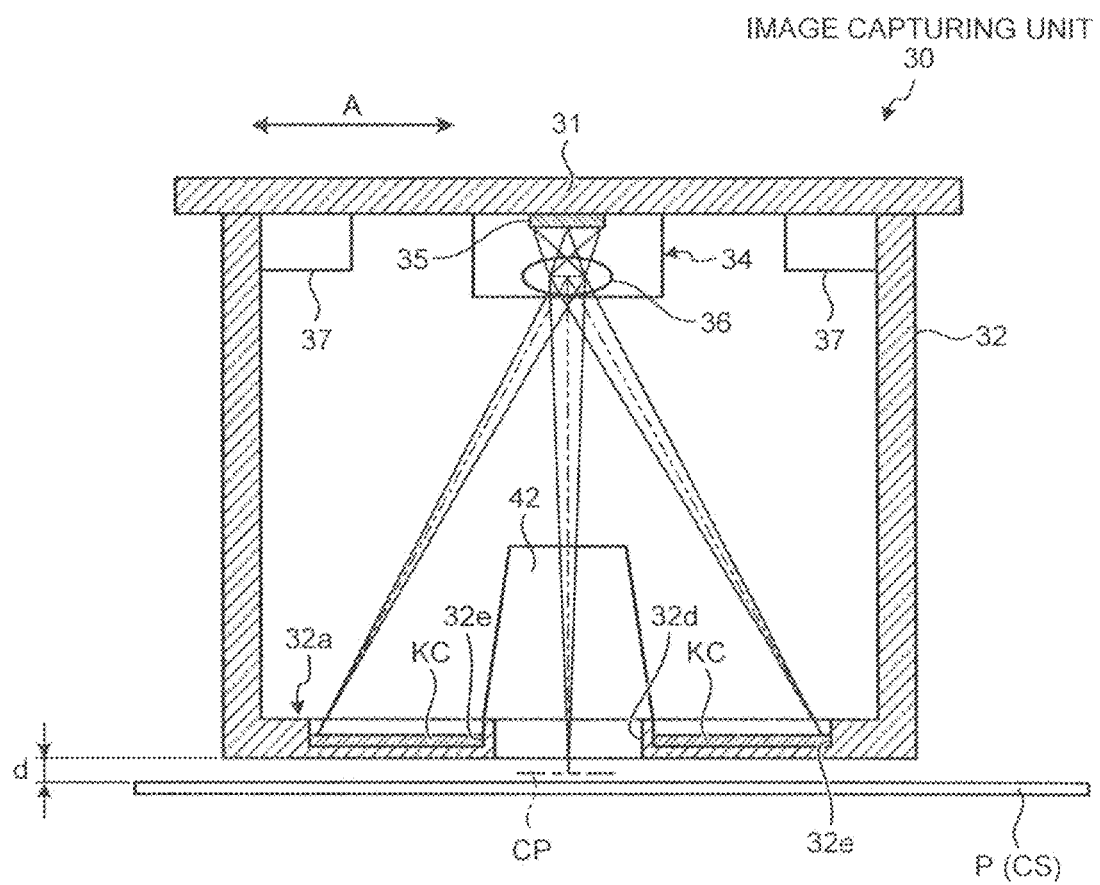
FIG. 29 is a front cross-sectional view of the image capturing unit in which the transmissive member is arranged on the bottom surface formed with the opening.

28, or may be arranged on the bottom surface 32a at the portion the opening 32d is formed, as illustrated in FIG. 29.

As described above, the image capturing unit 30 is not limited to a configuration in which the opening 33a for imaging the subject is formed at the middle of the bottom surface 32a of the housing 32, and for example, a configuration in which the reference chart KC and the opening for imaging the subject are arranged so as to be lined in the main-scanning direction may be adopted, as illustrated in FIGS. 30 to 33.

Figure 30:
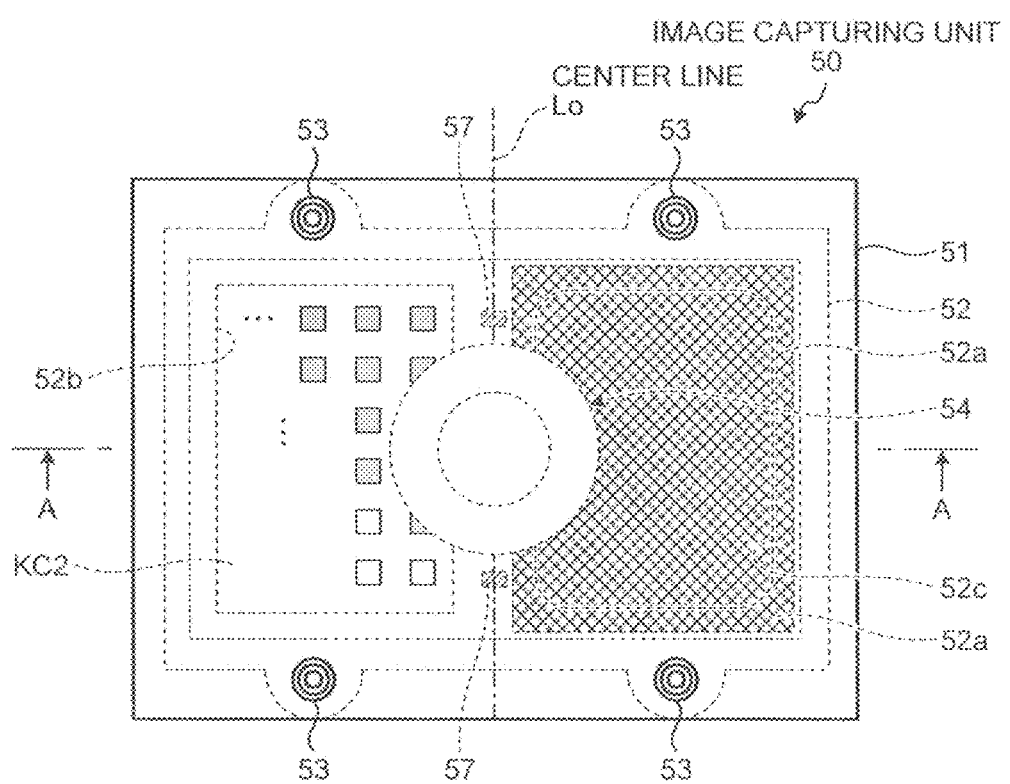
FIG. 30 is a top view of the image capturing unit in which the reference chart and the opening for imaging are arranged side by side.
Figure 31:
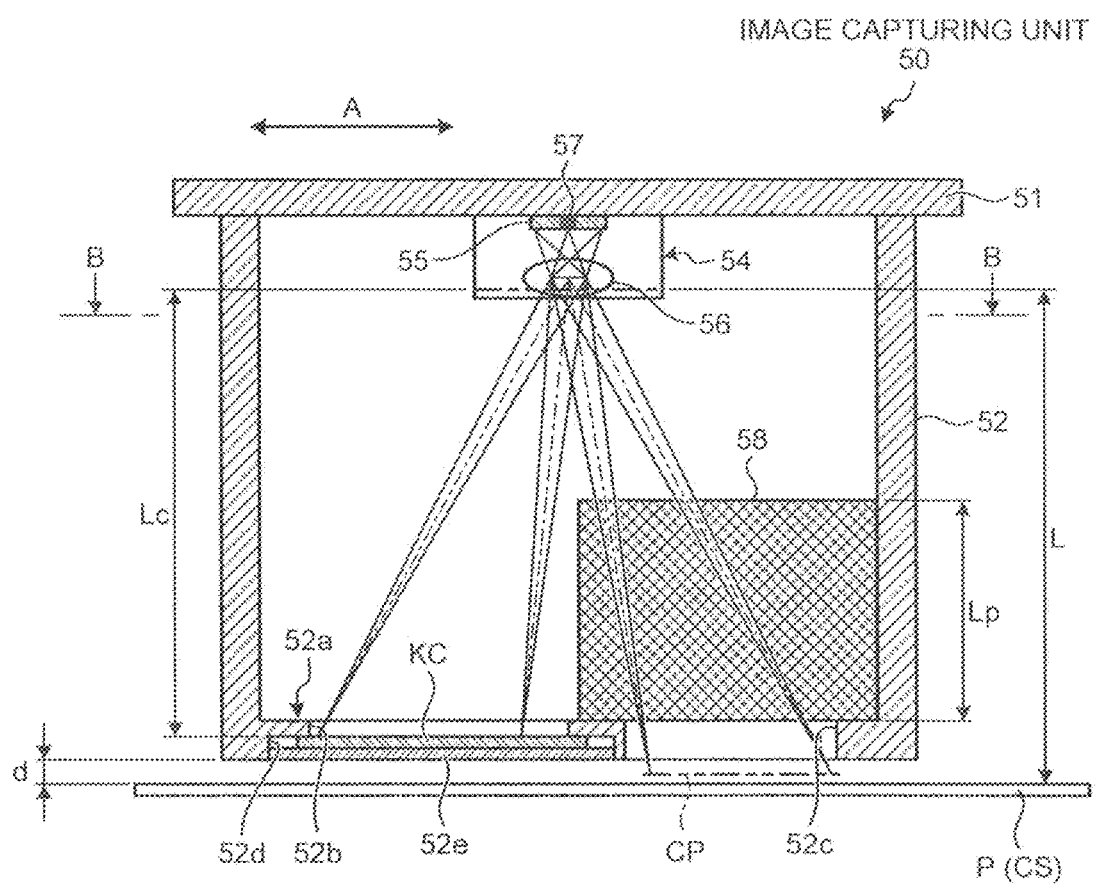
FIG. 31 is a cross-sectional view taken along line A-A of the image capturing unit of FIG. 30.
Figure 32:
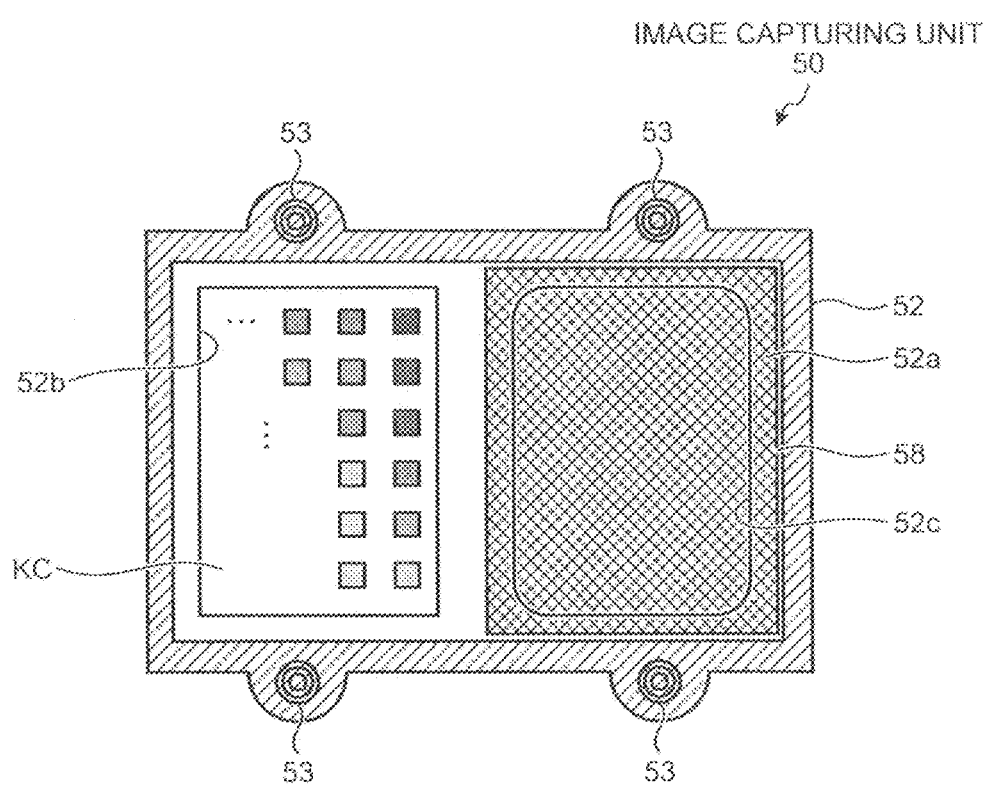
FIG. 32 is a cross-sectional view taken along line B-B of the image capturing unit of FIG. 31.
Figure 33:
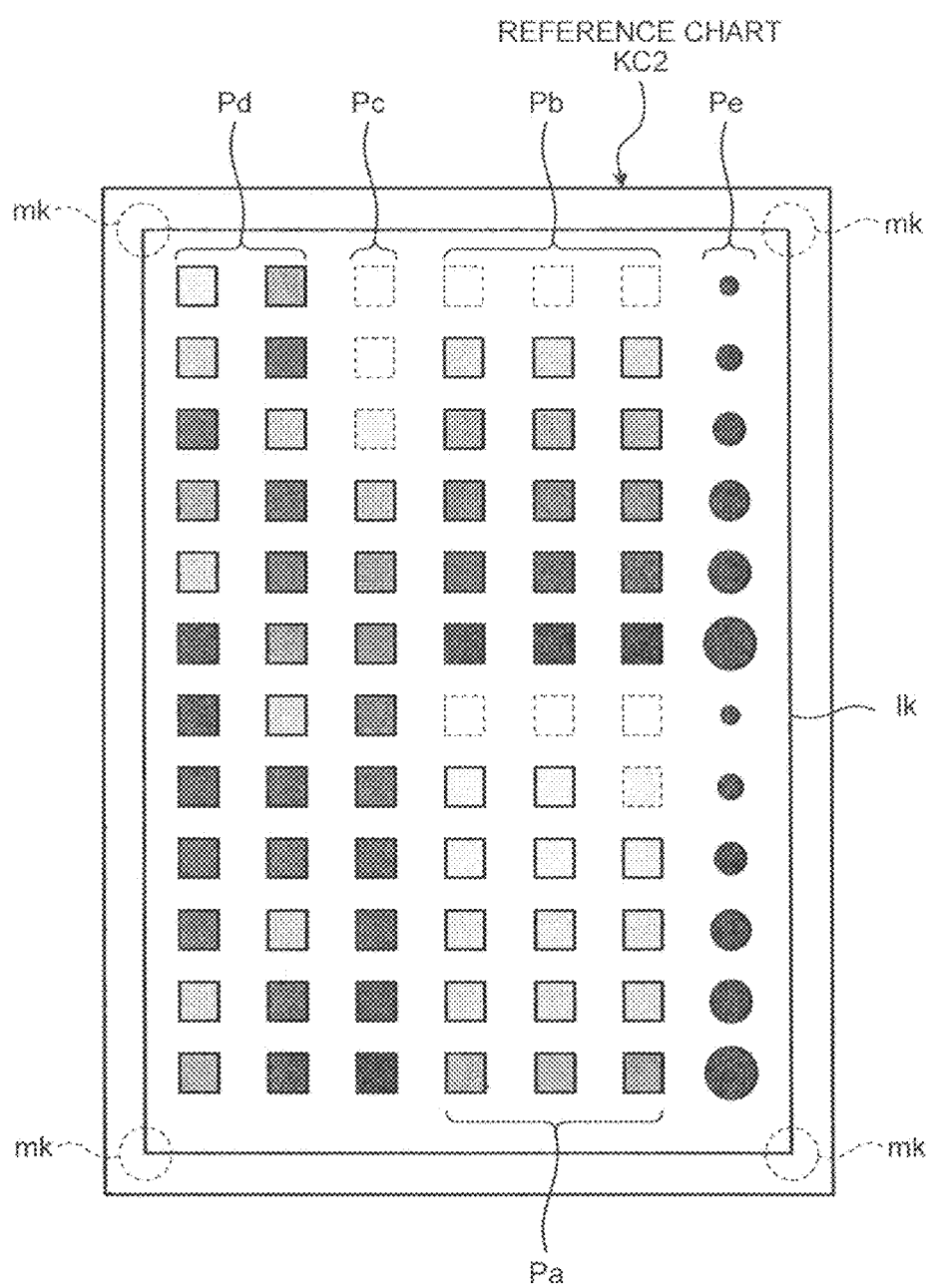
FIG. 33 is a plan view of the reference chart.

In other words, in FIGS. 30 to 32, an image capturing unit 50 has a housing 52 of a square box shape in which the surface on a substrate 51 side is opened is fixed to the substrate 51 by a fastening member 53, and the substrate 51 is fixed to the carriage 6 of the image forming device 1 illustrated in FIG. 1.

The image capturing unit 50 has an image sensor unit 54 arranged at a central part of the surface on the housing 52 side of the substrate 51, which image sensor unit 54 includes a two-dimensional image sensor 55 such as a CCD (Charge Coupled Device) sensor, a CMOS (Complementary Metal Oxide Semiconductor) sensor and the like, and a lens 56. The image capturing unit 50 has a pair of illumination light sources 57 mounted on the substrate 51 at positions spaced apart at an equal interval by a predetermined amount in the sub-scanning direction from the center of the image sensor unit 54 on a center line Lo in the sub-scanning direction passing through the center of the image sensor unit 54, where LED and the like are used for the illumination light source 57.

The image capturing unit 50 has the housing 52 attached to the carriage 6 with the lower surface of a surface portion (hereinafter referred to as bottom surface) 52a on the opposite side of the substrate 51 facing the recording medium P on the platen 14 with a predetermined spacing d, and an opening 52b and an opening 52c of a substantially rectangular shape are respectively formed in the main-scanning direction in the bottom surface 52a with the center line Lo as the center. Similar to the description made above, the spacing d is preferably small in view of a focal length with respect to a two-dimensional image sensor 55, but is set to a size the lower surface of the housing 52 and the recording medium P do not contact, for example, about 1 mm to 2 mm according to the relationship with the planarity of the recording medium P.

The opening 52b is formed with a recess 52d of a predetermined width along the periphery of the opening 52b on the surface on the recording medium P side, and a reference chart KC2 is detachably set in the recess 52d. A holding plate 52e for holding the reference chart KC2 in the recess 52d while covering the surface on the recording medium P side of the reference chart KC2 is detachably attached to the recess 52d of the opening 52b of the housing 52, so that the opening 52b is closed by the reference chart KC2 and the holding plate 52e. The holding plate 52e has the surface on the recording medium P side formed to a smooth flat surface.

The opening 52c is used to image the reference color patch KP of the reference sheet KS and the color measurement adjustment color patch CP of the color measurement adjustment sheet CS, which are the subject to be imaged, formed in the recording medium P. The opening 52c is to be at least a size at which all the images to be imaged can be imaged, but is formed to an open state slightly larger than the size of the image capturing region to be imaged in view of the shadow that forms around the opening 52c due to the spacing d between the housing 52 and the imaging target.

The reference chart KC2 is imaged with the reference color patch KP and the color measurement adjustment color patch CP by the image capturing unit 50 as a comparison target with an image capturing color measurement value of the reference color patch KP of the reference sheet KS and the color measurement adjustment color patch CP of the color measurement adjustment sheet CS to be imaged in the color adjustment processing. In other words, the image capturing unit 50 images, as a comparison target, the color patch of the reference chart KC2 attached to the recess 52d formed at the periphery of the opening 52b of the bottom surface 52a of the housing 52 with the imaging of the reference color patch KP of the reference sheet KS exterior to the housing 52 and the color measurement adjustment color patch CP of the color measurement adjustment sheet CS through the opening 52c formed at the bottom surface 52a of the housing 52. The image capturing unit 50 reads the reference color patch KP of the reference sheet KS and the color measurement adjustment patch CP of the color measurement adjustment sheet CS in order since the two-dimensional image sensor 55 sequentially scans the pixels to read the image, but in this case, the images of the reference color patch KP, the color measurement adjustment patch CP, and the reference chart KC2 are acquired in one frame.

Similar to the reference sheet KS described above, the reference chart KC2 is formed with a plurality of reference color patch rows Pa to Pd for color measurement, a dot diameter measurement pattern row Pe, a distance measurement line lk, and a chart position specifying marker mk on a surface (upper surface) on the interior side of the housing 52.

The patch rows Pa to Pd for color measurement include the patch row Pa in which color patches of a primary color of YMC are arranged in order of scale, the patch row Pa in which color patches of secondary color of RGB are arranged in order of scale, the patch row (achromatic color scale pattern) Pc in which patches of gray scale are arranged in order of scale, and the patch row Pd in which patches of tertiary color are arrayed; and the dot diameter measurement pattern row Pe is a pattern row for measuring geometrical shape in which circular patterns of different sizes are arrayed in the order of size.

The distance measurement line lk is formed as a frame line of a square that surrounds the color measurement patch rows Pa to Pd and the dot diameter measurement pattern row Pe. The chart position specifying marker mk is a marker arranged at positions of four corners of the distance measurement line lk to specify the position of each patch.

The color measurement control unit 106 specifies the position of the reference chart KC and the position of each pattern by specifying the distance measurement line lk and the chart position specifying markers mk at the four corners thereof from the image data of the reference chart KC2 acquired from the image capturing unit 50.

Each patch configuring the reference color patch rows Pa to Pd for color measurement has a color value (Lab value) in the L*a*b* color space, which is a standard color space, measured in advance using a spectroscope BS, which color value becomes a reference value when performing color measurement on the color measurement adjustment color patch CP of the color measurement adjustment sheet CS. The configuration of the patch rows Pa to Pd for color measurement arranged in the reference chart KC2 is not limited to the arrangement example illustrated in FIG. 33, and an arbitrary patch row can be used. For example, a patch that can widely specify a color range as much as possible may be used, and the patch row Pa of the primary color of YMCK and the patch row Pc of the gray scale may be configured with the patches of the color measurement value of the ink used in the image forming device 1. The patch row Pa of the secondary color of RGB of the reference chart KC2 may be configured with the patch of the color measurement value that can produce color with the ink used in the image forming device 1, and a reference color chart in which the color measurement value such as Japan Color and the like is defined may be used.

The reference chart KC2 is arranged in the recess 52d formed at the outer periphery of the surface on the recording medium P side of the opening 52b formed in the bottom surface 52a of the housing 52, so that the reference chart KC2 can be imaged with the two-dimensional image sensor 55 of the image sensor unit 54 with the focal length similar to the imaging target such as the recording medium P, and the like.

The reference chart KC2 is detachably set in the recess 52d formed on the outer periphery of the surface on the recording medium P side of the opening 52b formed in the bottom surface 52a of the housing 52, and the surface on the recording medium P side is detachably held with the holding plate 52e detachably attached to the recess 52d, so that even if dust and the like that entered the housing 52 attaches to the surface of the reference chart KC2, the holding plate 52e and the reference chart KC2 can be detached, and attached again after cleaning the reference chart KC2, thus enhancing measurement accuracy of the reference chart KC2.

The image capturing unit 50 includes an optical path length changing member 58 arranged on the optical path of the recording medium P through the opening 52c and the two-dimensional image sensor 55 with the opening 52c closed, the optical path length changing member 58 being a transmissive member having an index of refraction n (n is an arbitrary value). As illustrated in FIGS. 30 to 32, the optical path length changing member 58 has an outer shape greater than the opening 52c and is arranged in the housing 52. The fixed position of the optical path length changing member 58 is not limited to the position on the opening 52c at inside the housing 52, as illustrated in FIG. 31, and may be a position on the imaging surface side of the housing 52, a position on the inner side of the housing 52 and distant from the opening 52c, and the like, for example, as long as it is on the optical path of the opening 52c and the two-dimensional image sensor 55. When light transmits through the optical path length changing member 58 having an index of refraction n, such light enters the two-dimensional image sensor 55 with the optical path length extended according to the index of refraction n of the optical path length changing member 58 and the image bulged out, where the amount of bulging C of the image can be obtained with the following equation (1) assuming the length of the optical path length changing member 58 is Lp.

$$C = Lp(1 - 1/n) \quad (1)$$

The focal length L of the focus surface of the image capturing unit 50 other than the reference sheet KC2, that is, the focal length L to the surface of the recording medium P imaged through the optical path length changing member 58 and the opening 52c can be obtained with the following equation (2).

$$L = Lc + Lp(1 - 1/n) \quad (2)$$

Lc is a distance between a vertex portion on the imaging target side of the lens 56 and the reference chart KC2 and n is the index of refraction of the optical path length changing member 58.

Therefore, for example, if the index of refraction n of the optical path length changing member 58 is 1.5, $L = Lc + Lp(1 - 1/1.5) = Lc + Lp(1/3)$ is obtained, whereby the optical path length can be extended by about 1/3 of the length Lp of the optical path length changing member 58. If Lp=9 [mm] and L=Lc+3 [mm], the imaging position of the reference chart KC2 and the focus position of the imaging surface of the recording medium P can be coincided, and the reference chart KC2 and the imaging surface of the recording medium P can be set to a conjugate relationship. In FIG. 31, the optical path is illustrated as if greatly changed to facilitate the understanding of the optical path length changing processing by the optical path length changing member 58, but this does not mean that the actual changing state of the optical path will become the illustrated state.

The image capturing unit 50 can image both the reference chart KC2 and the imaging surface of the recording medium P under the same illumination condition, where the illumination light that irradiates the reference chart KC2 and the illumination light that irradiates the imaging surface of the recording medium P through the optical path length changing member 58 and the opening 52c are illumination light from the same illumination light source 57. The illumination light source 57 is arranged on the center line Lo, which is substantially an intermediate position of the reference chart KC2 and the recording medium P, and two of which are arranged on the center line Lo with respect to the lens 56, so that the reference chart KC2 and the imaging region of the recording medium P can be evenly illuminated with substantially the same condition.

The image capturing unit 50 has the arrangement condition of the opening 52c and the reference chart KC2 of the image capturing region arranged substantially symmetric to the center line Lo connecting the center of the lens 56 and the illumination light source 57, so that the imaging condition of the two-dimensional image sensor 55 may be line symmetric and may be the same, whereby the accuracy in the color adjustment processing and the color measurement processing of the two-dimensional image sensor 55 using the reference chart KC2 can be enhanced.

Figure 34:
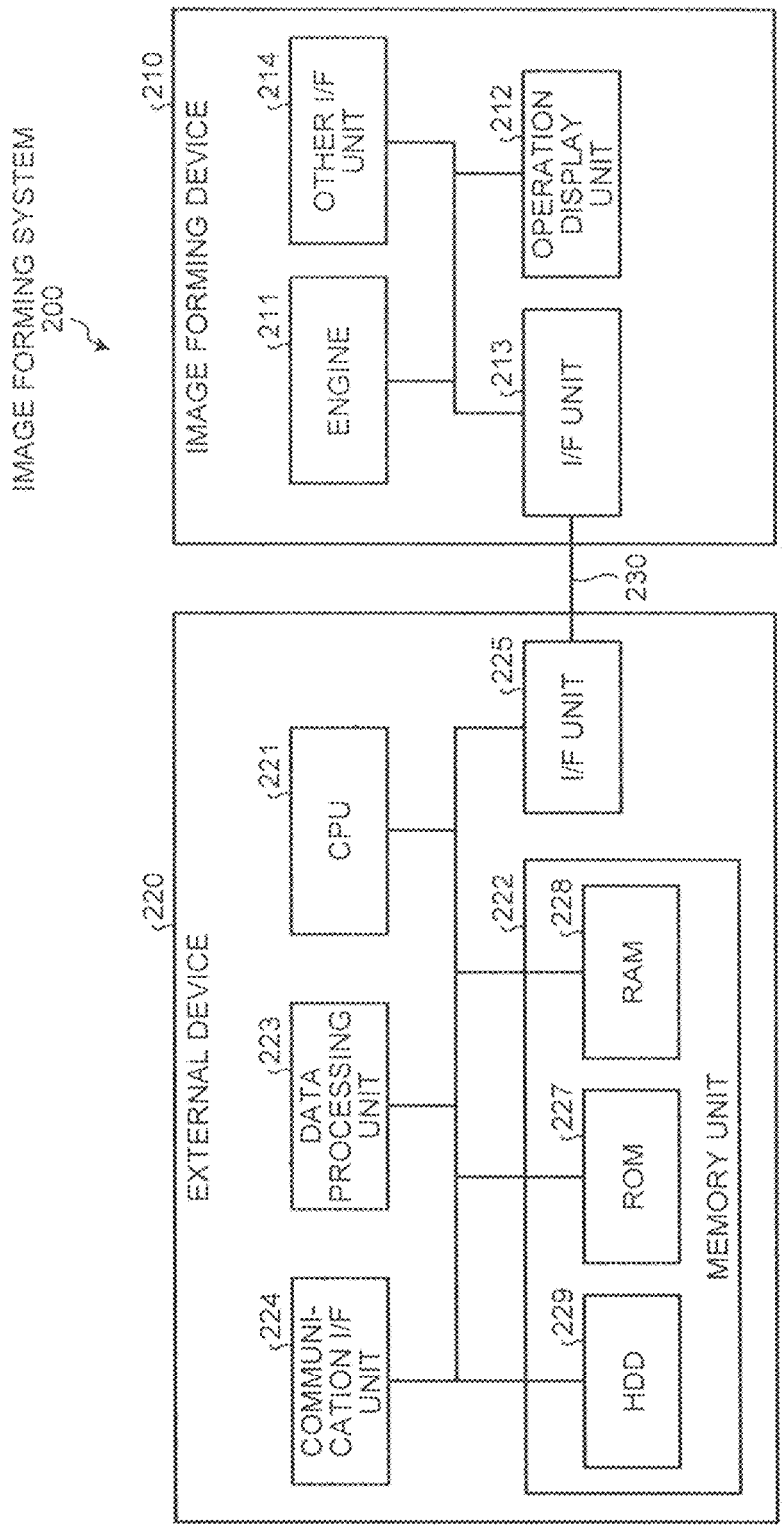
FIG. 34 is a system configuration diagram of the image forming system.

In the description made above, the color measurement processing is carried out by the color measurement control unit 106 of the image forming device 1, but the color measurement processing does not need to be executed in the image forming device 1, and for example, as illustrated in FIG. 34, in an image forming system (color measuring system) 200, an image forming device 210 is connected to an external device 220 so that the image data imaged with the image forming device 210 is output to the external device 220 and performed with color adjustment processing involving the color measurement processing by the external device 220, and the image data performed with the color adjustment processing is output to the image forming device 210 so that the image forming device 210 forms the image based on the image data from the external device 220.

In other words, the image forming device 210 includes an engine 211, an operation display unit 212, an I/F unit 213, and other I/F unit 214, and the like, which are connected by a bus 215. The external device 220, for example, can use a normal computer of hardware configuration and software configuration, and executes the color adjustment processing involving the color measurement processing by loading a color adjustment program including a color measurement program for executing the color adjustment processing involving the color measurement processing of the present invention as software. The external device 220 includes a CPU 221, a memory unit 222, a data processing unit 223, a communication I/F unit 224, an I/F unit 225, and the like, which are connected by a bus 226. The memory unit 222 includes a ROM 227, a RAM 228, a hard disc (HDD) 229, and the like.

The image forming device 210 is connected to the external device 220 by a line 230 with the I/F unit 213, and the line 230 is a dedicated line, network such as LAN (Local Area Network), and the like, the Internet, and the like, and may be wired or wireless.

The image forming device 210 forms and outputs the image on the recording medium with the engine 211 based on the image data transmitted from the external device 220 under the control of the external device 220. The engine 211 forms the image on the recording medium through ink injection method and the like, the operation display unit 212 includes various operation keys and a display such as LCD (Liquid Crystal Display), so that various information notified from the image forming device 210 to the user can be displayed and output on the display when various operations necessary for the operation of the image forming device 210 are performed by the operation key. The other I/F unit 214 is used for connection of an extension unit, and the like.

The engine 211 includes a carriage that moves in the main-scanning direction, similar to the description made in the above embodiment, and the image capturing unit 30 is attached to the carriage. The image forming device 210 forms the color measurement adjustment patch CP and generates the color measurement adjustment sheet CS on the recording medium based on the color patch data of the color measurement adjustment color patch CP transmitted from the external device 220 under the control of the CPU 221 of the external device 220, reads the color measurement adjustment patch CP of the generated color measurement adjustment sheet CS with the image capturing unit and transmits the same to the external device 220 through the I/F unit 213.

The external device 220 stores the image forming control program for performing the operation control of the image forming device 210, the color adjustment program for performing the color adjustment processing involving the color measurement processing of the present invention, and the necessary data in the hard disc 229 or the ROM 227, where the CPU 221 controls the image forming device 210 based on the program in the ROM 227 or the hard disc 229 to execute the basic processing of the image forming device 210 and execute the color adjustment processing involving the color measurement processing of the present invention.

The hard disc 229 stores the program, and also stores various data necessary for executing the color adjustment processing, in particular, at least one of the Lab value or the XYZ value of the measurement result of a plurality of reference color patches KP formed in an array on the reference sheet KS described in the above example, the imaging reference RGB value of when the reference patch KP of the reference sheet KS is read with the image capturing unit of the image forming device 210, the reference value linear transformation matrix, the table of proximate points and the selected RGB value linear transformation matrix, the initial reference RGB value RdGdBd of each color patch of the reference chart KCs read at the same time as the reference sheet KS, the color measurement reference RGB value RdsGdsBds of the reference patch of the reference chart KC2 read at the same time as when the color measurement adjustment color patch CP of the color measurement adjustment sheet CS is read, and the inter-reference RGB linear transformation matrix for converting the color measurement reference RGB value RdsGdsBds to the initial reference RGB value RdGdBd.

The communication I/F unit 224 is connected to the image processing apparatus such as a scanner device, a multifunction peripheral, and other external devices through a line such as network, and receives the image data to image output to the image forming device 210.

The data processing unit 223 performs various image processing necessary for forming and outputting with the engine 211 of the image forming device 210 on the image data.

As described above, the CPU 221 controls the operation of the image forming device 210, and executes the color measurement processing executed by the calculating unit 124 of the color measurement control unit 106, in particular, the color measurement value calculating unit 126 to obtain the color measurement value, performs color adjustment on the image data based on the relevant color measurement value, and outputs to the image forming device 210.

In the image forming system 200 of FIG. 34, the operation of the image forming device 210 is controlled by the external device 220, but the image forming device 210 itself may include a controller such as a CPU so that the relevant controller performs the control for the image forming operation itself, and the external devices 220 executes only the color measurement processing for obtaining the color measurement value or only the color adjustment processing including the color measurement processing.

Thus, when at least the color measurement processing or the color adjustment processing including the color measurement processing is executed with the external device of the image forming device 210, the color reproducibility can be enhanced inexpensively and appropriately even in a less expensive image forming device 210.

According to the present invention, the subject and the reference chart can be imaged in a stable positional relationship on a constant basis.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing unit comprising:
    a sensor unit that captures a predetermined area including a subject;
    a reference chart that is arranged in the predetermined area and captured together with the subject by the sensor unit;
    an optical path length changing member that is arranged on an optical path extending from the subject to the sensor unit and is capable of changing a length of the optical path; and
    a housing having an opening on a first surface facing the subject, wherein
    the sensor unit captures the subject positioned outside the housing through the opening from inside the housing, and captures the reference chart not through the opening, and
    the opening is arranged at a center of the predetermined area.

2. The image capturing unit according to claim 1, wherein the opening is formed on the first surface of the housing so as to be positioned on a perpendicular line drawn from the sensor unit to the first surface.

3. The image capturing device according to claim 1, wherein the reference chart includes a plurality of chromatic patches.

4. The image capturing unit according to claim 1, further comprising an illumination light source that illuminates the subject and the reference chart.

5. The image capturing unit according to claim 1, wherein the reference chart is detachably held with respect to the housing.

6. The image capturing unit according to claim 1, wherein the reference chart includes an achromatic scale pattern.

7. The image capturing unit according to claim 1, wherein
the subject is an image output by an image forming apparatus on a recording medium; and
the reference chart includes a dot diameter measurement pattern for measuring a dot diameter in the image.

8. The image capturing unit according to claim 2, wherein the reference chart is arranged on the first surface of the housing so as to surround a periphery of the opening.

9. A color measuring device comprising:
the image capturing unit according to claim 1; and
a calculating unit configured to calculate a color measurement value of the subject based on the image of the subject and the reference chart captured in the sensor unit.

10. An image forming apparatus comprising:
an image output unit that outputs an image on a recording medium; and
the color measuring device according to claim 9; wherein
the color measuring device calculates a color measurement value of the image with the image output by the image output unit as the subject.

11. The image capturing unit according to claim 1, wherein the opening is arranged at a position on an optical axis of the sensor unit.

12. A color measuring system comprising an image capturing unit that captures a subject of color measurement target, and a calculating unit that calculates a color measurement value of the subject, wherein
the image capturing unit includes:
   a sensor unit that captures a predetermined area including the subject;
   an optical path length changing member that is arranged on an optical path extending from the subject to the sensor unit and is capable of changing an optical path length; and
   a reference chart unit that is arranged in the predetermined area and captured together with the subject by the sensor unit, and
   a housing having an opening on a first surface facing the subject, wherein
the sensor unit captures the subject positioned outside the housing through the opening from inside the housing, and captures the reference chart unit not through the opening,
the opening is arranged at a center of the predetermined area, and
the calculating unit calculates a color measurement value of the subject based on an image of the subject and the reference chart unit captured by the sensor unit of the image capturing unit.

13. A color measuring method executed in a color measuring device including a sensor unit, a reference chart unit, a calculating unit, an optical path length changing member arranged on an optical path extending from the subject to the sensor unit, and a housing having an opening on a first surface facing the subject, the method comprising:
capturing a subject of a color measurement target and the reference chart unit in a predetermined area using the sensor unit; and
calculating a color measurement value of the subject using the calculating unit based on an image of the subject and the reference chart unit captured using the sensor unit, wherein
said capturing using the sensor unit captures the subject positioned outside the housing through the opening from inside the housing, and captures the reference chart unit not through the opening, and
the opening is arranged at a center of the predetermined area.

* * * * *